US009442020B2

(12) United States Patent
Durand et al.

(10) Patent No.: US 9,442,020 B2
(45) Date of Patent: Sep. 13, 2016

(54) METHOD FOR CORRECTING THE DRIFT OF AN INFRARED RADIATION DETECTOR COMPRISING AN ARRAY OF RESISTIVE IMAGING BOLOMETERS AND DEVICE IMPLEMENTING SUCH A METHOD

(71) Applicant: ULIS, Veurey Voroize (FR)

(72) Inventors: Alain Durand, Voiron (FR); Michel Vilain, Saint Georges de Commiers (FR); Christophe Minassian, Voreppe (FR)

(73) Assignee: ULIS, Veurey Voroize (FR)

( * ) Notice: Subject to any disclaimer, the term of this patent is extended or adjusted under 35 U.S.C. 154(b) by 781 days.

(21) Appl. No.: 13/771,950

(22) Filed: Feb. 20, 2013

(65) Prior Publication Data

US 2013/0218500 A1     Aug. 22, 2013

(30) Foreign Application Priority Data

Feb. 22, 2012   (FR) ...................................... 12 51592

(51) Int. Cl.
| | |
|---|---|
| *H04N 5/33* | (2006.01) |
| *G01J 5/22* | (2006.01) |
| *G01J 5/00* | (2006.01) |
| *G01J 5/24* | (2006.01) |

(52) U.S. Cl.
CPC .. *G01J 5/24* (2013.01); *G01J 5/22* (2013.01); *H04N 5/33* (2013.01); *G01J 2005/0048* (2013.01)

(58) Field of Classification Search
CPC ............... G01J 5/24; G01J 5/22; H04N 5/22
USPC .......................................................... 702/87
See application file for complete search history.

(56) References Cited

U.S. PATENT DOCUMENTS

| | | | |
|---|---|---|---|
| 7,030,378 B2 | 4/2006 | Allen et al. | |
| 2001/0040216 A1* | 11/2001 | Knauth ...................... | G01J 5/20 250/352 |
| 2009/0152465 A1* | 6/2009 | Dupont .................... | G01J 5/24 250/338.1 |
| 2010/0065729 A1* | 3/2010 | Legras ..................... | G01J 5/24 250/252.1 |

FOREIGN PATENT DOCUMENTS

| | | |
|---|---|---|
| FR | 2936052 A1 | 3/2010 |
| FR | 2951895 A1 | 4/2011 |
| WO | WO-2010-037944 A1 | 4/2010 |

OTHER PUBLICATIONS

Republique Francaise, Rapport De Recherche Preliminaire for Corresponding French Application No. 1251592 dated Nov. 19, 2012 (2 pgs).

E. Mottin, et al., Uncooled amorphous silicon technology enhancement for 25μm pixel pitch achievement, Infrared Technology and Applications, Proceedings of SPIE vol. 4820 (2003) (8 pgs).

* cited by examiner

*Primary Examiner* — Mohamed Charioui
*Assistant Examiner* — Catherine Rastovski
(74) *Attorney, Agent, or Firm* — Harris Beach PLLC

(57) ABSTRACT

A method for detecting infrared radiation includes the steps of: providing a resistive bolometer retina including a plurality of resistive bolometers suspended above a substrate of a bolometric detector; acquiring the infrared radiation by the resistive bolometer retina to produce a plurality of raw read signals provided by the bolometers; correcting a response dispersion of the resistive bolometers in the raw read signals using a gain table, each gain of the gain table being associated with a bolometer of the resistive bolometer retina.

15 Claims, 5 Drawing Sheets

METHOD FOR CORRECTING THE DRIFT OF AN INFRARED RADIATION DETECTOR COMPRISING AN ARRAY OF RESISTIVE IMAGING BOLOMETERS AND DEVICE IMPLEMENTING SUCH A METHOD

CROSS-REFERENCE TO RELATED APPLICATIONS

This application claims the benefit of French Patent Application No. 1251592, filed on Feb. 22, 2012. The entirety of this application is incorporated herein by reference.

FIELD OF THE INVENTION

The present disclosure relates to the field of infrared bolometric imaging and thermography.

More specifically, the present disclosure relates to a method for correcting the calibration drift to of an infrared detection device, or detector, intended for imaging, or for thermographic imaging (measurement of the temperature of the scene based on the received radiative thermal power) of an infrared radiation based on an array of so-called imaging resistive bolometers.

BACKGROUND

In imaging and infrared thermography, it is conventional to use so-called "uncooled" detectors operating close to the ambient temperature, this term for example applying to temperatures ranging between −40° C. and +90° C. Such detectors may be temperature-regulated at their focal plane, typically by means of a Peltier cooler ("TEC"). More generally, the focal plane is however free of having a variable temperature ("TEC-less"). Such devices use the variation of a physical quantity of an appropriate material, according to temperature, around 300 K. In the most current case of bolometric detectors, this physical quantity is the electric resistivity.

An elementary detector of such a detection device generally associates:
  means for absorbing the infrared radiation and for converting it into heat;
  means for thermal isolating the detector, to enable it to heat up under the action of infrared radiation;
  thermometry means which, in the context of a bolometric detector, use a resistive element;
  and means for reading the electric signals provided by the thermometry means.

This type of detectors intended for infrared imaging is conventionally made in the form of a bidimensional array of elementary detectors, or bolometers, each elementary detector of said array being formed of a membrane suspended via supporting arms above a batch-manufactured support substrate. Such an elementary detector array is usually called an imaging "retina".

Electronic means for sequentially addressing elementary detectors and for forming an electric signal in relation with each bolometer, and for then possibly processing said signal in more or less sophisticated fashion, are further provided in the circuit, usually made of silicon. The general electronic system directly connected to the bolometers is known as "read out integrated circuit" (ROIC).

To obtain the image of a scene via this detector, the image of the scene is projected through an adapted optical device onto the elementary detector array, this array being placed in the focal plane of the optical device. Rated electric stimuli are applied via the read circuit to each of the to elementary detectors, or to each row of such detectors, to obtain an electric signal forming the image of the temperature reached by each of said elementary detectors. This electric signal directly depending on the electric resistance of each elementary detector is used by the application system integrating the detector, to form the thermal image of the observed scene. Such a system is conventionally called "camera".

Now, it is generally observed that bolometric materials currently used to manufacture an imaging bolometer, such as for example amorphous silicon (a-Si), silicon germanium alloy (a-$Si_xGe_{1-x}$), or vanadium oxide ($VO_x$), have an electric resistance which more or less drifts along time, for exposure conditions corresponding to the normal use of the detector.

More critically still, a drift can also be observed when the detectors have been momentaneously irradiated by a very intense infrared source, for example, the sun or strong radiative sources (projectors, etc.). In this case, term "remanence" is preferably used since the "drift" does not concern all the elementary points of the detector, but only the areas corresponding to the image of the hot source through the optical device, which form a remanent "image" after the source having created this mark has disappeared. In this case, it is often spoken of a "ghost image" (or "sunburn"), which disappears more or less rapidly along time, since the sensitive material of the image points concerned by this high irradiation has been temporarily modified, and then returns at a variable speed to its state before irradiation. Such artifacts adversely affect the image quality, and most of all locally distort the detector calibration, that is, the ratio of the output signal to the temperature of the observed scene.

In the context of the present invention, general term "drift" of a bolometer characterizes the fact that, for given environmental and operating conditions, called "reference conditions" hereafter, such as for example the incident radiation on the bolometer, the ambient temperature for it (internal camera temperature), and the electric read signals, the electric characteristics of the bolometer have drifted away along time from their initial reference values, which can be observed in such conditions, especially in a specific exfactory acquisition operation, called calibration, before the putting into service of the detector.

In the context of the present invention, the difference observed between the signal obtained during the calibration operation and the signal which would be obtained at any subsequent time in the detector lifetime if it was placed back in the exact same conditions, is called "drift", be it a variation resulting from a slow evolution, generally spatially uniform, of the sensitivity characteristics of all the detector bolometers, in relation with the relative natural instability of the currently-used thermometric materials, or much faster variations (on appearing thereof, and as they subsequently relax) spatially distributed and variable along time, resulting from too long an observation of an intense radiation source.

To provide a proper introduction to the following, the most current calibration process of the state of the art will be detailed.

Very generally, this calibration process comprises the elaboration of bidimensional correction parameters (usually called "tables") of offsets and gains of the array retina, which are then used during the detector operation to correct the bolometer characteristic dispersions.

The offset table is obtained by measuring and storing all the output signals obtained when facing a first scene of uniform temperature (for example, a reference black body taken to a first temperature T1). The output signal (or continuous level), is called $NC_{T1}$, and the specific signal of a bolometer of coordinates (i,j) in the bolometer array is called $NC_{T1}(i,j)$. The offset table thus simply gathers all values $NC_{T1}(i,j)$, which represent the distribution (the dispersion) of the output signal in such reference conditions.

The detector is then placed in front of a different second scene of uniform temperature, for example, a second reference black body taken to a second temperature T2, and a new table $NC_{T2}(i,j)$ is acquired and stored.

Reference gain table $G_{ref}(i,j)$ defined by relation:

$$G_{ref}(i,j) = \frac{\overline{NC_{T2}} - \overline{NC_{T1}}}{NC_{T2}(i,j) - NC_{T1}(i,j)}$$

is then calculated from tables $NC_{T1}(i,j)$, $NC_{T2}(i,j)$, and respective algebraic averages $\overline{NC_{T1}}$ and $\overline{NC_{T2}}$ of these tables. In the rest of the present document, a $\overline{V}$ type notation, where V is a "table" of scalar values of same dimensions as the retina, represents the algebraic average of this table.

Table $G_{ref}(i,j)$ shows the relative distribution (dispersion) of the response or responsiveness of all the retina bolometers.

Such offset and gain tables, resulting from the calibration, are stored in the camera and used, after its putting into service, by a calculation unit integrated to the camera to perform the to conventional "two-point correction" of each raw signal S(i,j) of each image frame, to obtain corrected signal $S_{corr}(i,j)$ according to the following relation:

$$S_{corr}(i,j) = G_{ref}(i,j) \cdot (S(i,j) - NC_{T1}(i,j)) + \overline{NC_{T1}}$$

Each raw signal S(i,j) thus has its individual difference with respect to the average of the imager corrected in terms of offset and gain.

Usually, the camera is provided with a shutter, interposed between the optics and the sensitive focal plane, intended to form the equivalent of a uniform thermal scene at the shutter temperature.

When it is considered that output signal $S_{corr}(i,j)$ is no longer sufficiently accurate, for example, due to a temperature drift or to the temperature dispersion of the focal plane, especially for "TEC-less" detectors having no temperature regulation, or due to the small individual or general drifts of bolometers, the shutter is activated and offset table $NC_{T1}$ is updated, for example replaced, with a new table $NC_{shut}$ of the raw output signals corresponding to the closed shutter.

The conventional use of a shutter thus provides a simple and accurate way to form satisfactory offset tables. However, the observation of a scene which is naturally essentially uniform at ambient temperature, with no shutter, or the use of means for uniformizing the scene radiation, for example, by defocusing of the image, is also possible in the context of the present invention. Hereafter, to simplify notations, it will be written that table $NC_{shut}$ "corresponds to the shutter" without for this to necessarily imply the presence of a mechanical shutter.

The images obtained after reopening of the shutter are then efficiently corrected again by means of the new offset table.

It is usually considered that it is not necessary to update the gain table, since the physical phenomena causing the relative response dispersions, as compared with the average value, practically do not vary during the entire detector lifetime.

Indeed, response Resp of a voltage-biased bolometer (that is, submitted to a constant voltage and with no other external constraint on the current flowing through the bolometer) can generically be expressed as follows:

$$Resp = \frac{\partial S}{\partial \theta_{scène}} \propto \frac{1}{R_{ac}} A \times \varepsilon \times TCR \times R_{th} \times \frac{\partial \Phi(\theta_{scène})}{\partial \theta_{scène}} \quad (1)$$

where:
  $R_{ac}$ is the electric resistance of the bolometer;
  A is the area of the bolometer dedicated to the absorption of the radiation;
  $R_{th}$ is the thermal resistance between the bolometer membrane and the substrate above which it is suspended;
  $\varepsilon$ is the effective optical coupling (or absorption) coefficient of the membrane;
  TCR is the variation coefficient of the electric resistance of the bolometer according to its temperature;
  $\Phi$ is the incident radiative energy flow on the bolometer; and
  $\theta_{scène}$ is the scene temperature.

The response is thus partly determined by architectural or design parameters, such as area A, thermal resistance $R_{th}$, coefficient $\varepsilon$, and various parameters of the optical system equipping the detector appearing in last term $\Phi(\theta_{scène})$.

Now, it can be observed that the value of this first group of parameters, to which the parameters of the read circuit intended for the forming of raw signal S(i,j) can be added, does not substantially vary along time and thus remains substantially constant all along the detector lifetime.

Another group of parameters is however involved in the bolometer response, in the form of the characters associated with the thermometric material thereof, that is, its electric resistance $R_{ac}$ (through its resistivity $\rho$) and its coefficient of relative variation of the resistance according to temperature TCR defined by the following relation:

$$TCR = \frac{1}{R_{ac}} \cdot \frac{\partial R_{ac}}{\partial T} \quad (2)$$

where T is the temperature of the bolometer membrane.

These material parameters are capable of significantly drifting, as already noted. In particular, electric resistance $R_{ac}$ of usual bolometry materials (essentially vanadium oxide and amorphous silicon) may intrinsically vary by a few percents along the detector lifetime. This resistance may also vary under the effect of a particularly high heating caused by an intense and/or prolonged infrared irradiation, which is more prejudicial in terms of image quality due to the fact that the to disturbance generally only concerns part of the retina. An "artificial" contrast spot which is not related to the scene thus forms on the image, said spot disappearing after correction of the sole offset, that is, after updating the "one-point" correction, but where the thermographic calibration is distorted since the initial gain table is no longer accurate on the retina portion which has been modified.

Such calibration variations or drifts may be significant as compared with the accuracy of the images or thermal measurements which are intended to be obtained. Thus, the gain table used in the "two point" correction requires being regularly recalibrated if a constant image quality is desired during the detector lifetime.

Methods for correcting these drifts have thus been provided, for example, in document FR 2936052. This document teaches, for a detector equipped with a shutter and with a Peltier cooler regulating the temperature of the focal plane with respect to a reference temperature, the correction of a responsiveness drift due to time or spatial variations of bolometric resistances. The implemented principle is based on a device comprising a reference resistance, itself subject to the considered drift, and means for measuring the drift of this reference resistance with respect to its initial value. These means are activated each time an update of the gain table is deemed necessary due to a drift of the bolometer responsiveness. The correction comprises, while the detector is "in service", acquiring the raw signals corresponding to the shutter, deducing from these signals a relative variation of this reference resistance with respect to its initial value, and then multiplying the gains of the gain table by a factor proportional to said relative variation.

Detector "in service" means that the correction may be performed while the camera is for example available for the user, by a procedure which does not use the calibration methods applied by the constructor in factory, especially by means of black bodies.

The performed correction may be general (unique and valid for the entire retina) or individual (adapted to each sensitive point) in the case where the reference resistance is the bolometer itself. The gain table thus updated is then applied to the correction, for example, digital, of the raw signals. A substantial correction of errors due to the responsiveness drift is thus obtained.

This method is efficient in that it suppresses most of the calibration differences, and, in case of an individual implementation, also most of the drifts due to intense local irradiations.

It can however be observed that "remanent"-type spatial responsiveness disturbances due to an to intense local irradiation are not perfectly corrected in all operating conditions of the camera. Indeed, when the temperature of the shutter during the calibration is close to the average temperature of the scene observed afterwards, the "two-point" corrected image resulting from the updated offset and gain tables is satisfactory.

However, when the camera temperature, and thus the shutter temperature, is remote from the average temperature of the scene, there remains after the "two-point" correction a well apparent ghost image of the previously-disturbed areas, in particular on images of low thermal contrast, which tend to be overcorrected, thus resulting in an inversion of the local contrast on the image after correction.

FIG. 1 is a thermal image obtained from a bolometric detector of the state of the art based on amorphous silicon implementing the teachings of document FR 2936052 and illustrating the overcorrection phenomenon. The image of FIG. 1 is obtained after a "two-point" correction of the state of the art, after the offset table has been corrected while the camera, and thus the shutter, had an average temperature of 60° C. The observed scene has an average temperature of 30° C. The grey scale of this image assigns a light shade to higher temperatures, the general dynamics of the image in terms of scene temperature being on the order of 4° C.

The dark spots are the "ghost images" before the two-point correction due to the presence of the sun in the image field of the detector in a use prior to the acquisition of the image of FIG. 1, according to various exposure times, at several points of the retina. Such spots appear in very light contrast when there is no correction, but appear in dark contrast on the corrected image, which means that these spots are overcorrected.

This example of the imaging field is also an illustration of prior art limitations in thermography. Indeed, the scene temperature estimate which would be extracted from the points located in the disturbed areas would be distorted with respect to the correct measurement provided by the neighboring undisturbed points.

Such imaging and calibration defects are correctable by means of a factory recalibration of the detector, by repeating the process of exposure to two black bodies at two reference temperatures T1 and T2, to determine a new gain table, as previously described. However, in addition to the fact that such a complex operation is impossible to implement for systems in service, that the camera should be replaced in the same thermal conditions as during the calibration, it should be repetitively reproduced in relaxation phases after an excessive irradiation. In fact, this solution cannot be envisaged without putting the camera out of service for a long time.

Document U.S. Pat. No. 7,030,378 provides a "field" approach based on two compared measurements of the electric resistances of the bolometers, obtained at two different operating temperatures of the camera itself, after initial factory calibration. In addition to the fact that this method requires a significant variation of this temperature to provide an exploitable result, it is not capable of providing a solution to the problem of insufficient calibration accuracy when the shutter is taken to a temperature very different from that of the scene.

There thus remains an obvious need to have a method capable of substantially removing residual calibration errors, and more specifically detrimental artifacts in imaging and thermography consecutive to periods of excessive exposure to an intense thermal radiation, always observed after a correction according to the state of the art.

There further remains a need to have a protocol for correcting drifts and said artifacts which does not require using specific conditions requiring putting the detector out of service for too much time.

There also remains a need to provide a protocol for correcting drifts or said artifacts applicable to cameras in service provided with standard state-of-the-art read circuits and further valid whatever the thermal form of the detector, that is, having a regulated focal plane temperature or of non-regulated type ("TEC-less").

DISCUSSION OF THE INVENTION

The present invention thus aims at providing a method for correcting output signals of a bolometric detector, capable of substantially maintaining the initial calibration accuracy along the entire lifetime of the detector, with no residual ghost images (imaging artifacts) in case of an excessive irradiation, despite time and/or spatial drifts inherent to the bolometric material used in the detector, and in all operating conditions of the camera in terms of ambient temperature.

To achieve this, the present invention aims at a method for correcting a gain table used in a to correction of a response dispersion of resistive bolometers of a resistive bolometer retina suspended above a substrate of a bolometric detector, said correction being applied to raw read signals provided by said bolometers, and each gain of the gain table being associated with a bolometer of the retina.

According to the present invention, the method comprises:

acquiring read signals from the retina corresponding to a substantially temperature-uniform scene;

calculating a table g for correcting the gain table according to the read signals acquired according to relation:

$$g(i, j) = \frac{R_{ac\_shut}(i, j)}{R_{ac\_ref}(i, j)} \cdot \frac{TCR_{ref}(i, j)}{TCR_{shut}(i, j)}$$

and correcting the gain table according to relation:

$$G_{shut}(i, j) = \frac{g(i, j) \cdot G_{ref}(i, j)}{N}$$

where:
- (i,j) represent the coordinates of the bolometers in the retina and the tables;
- $G_{ref}$ and $G_{shut}$ respectively are the gain table before correction and the corrected gain table;
- $R_{ac\_shut}(i,j)$ is the value of the resistance of the bolometer of coordinates (i,j) at the time of acquisition of the read signals;
- $R_{ac\_ref}(i,j)$ is a value of the resistance of the bolometer of coordinates (i,j) at a previous time;
- $TCR_{shut}(i,j)$ is a value of the temperature variation coefficient of the bolometer of coordinates (i,j) at the time of acquisition of the read signals;
- $TCR_{ref}(i,j)$ is a value of the temperature variation coefficient of the bolometer of coordinates (i,j) at the previous time; and
- N is a scalar factor for normalizing gain table $G_{shut}$.

Factor N is advantageously equal to the algebraic average of all the elements of numerator $N(i,j)=g(i,j)\cdot G_{ref}(i,j)$, in which case:

$$G_{shut}(i, j) = \frac{g(i, j) \cdot G_{ref}(i, j)}{\overline{g(i, j) \cdot G_{ref}(i, j)}} = \frac{g(i, j) \cdot G_{ref}(i, j)}{\overline{N(i, j)}} = \frac{g(i, j) \cdot G_{ref}(i, j)}{N}$$

The present invention also aims at a bolometric detector comprising means for implementing the previously-mentioned method.

According to an embodiment of the present invention, the bolometric material of the resistive bolometers is amorphous silicon or a silicon-germanium alloy, values $R_{ac\_ref}(i,j)$ are resistance values of the bolometers for an average temperature $T_{ref}$ thereof, and term $$\beta(i, j) = \frac{TCR_{ref}(i, j)}{TCR_{shut}(i, j)}$$

is calculated according to the following relation:

$$\beta(i, j) = \frac{1}{1 + \frac{K}{E_{a\_ref}} \cdot \ln\left(\frac{R_{ac\_shut}(i, j)}{R_{ac\_ref}(i, j)@T_{shut}}\right)} \cdot \frac{T_{shut}^2}{T_{ref}^2}$$

where:
- $T_{shut}$ is an average temperature of the bolometers at the time of acquisition of the signals;
- K is a predetermined coefficient depending on the resistive bolometers;
- $E_{a\_ref}$ is a predetermined value of the bolometer activation energy;
- ln is the natural logarithm; and
- $R_{ac\_ref}(i,j)@T_{shut}$ is a value at the previous time of the resistance of the bolometer of coordinates (i,j) for temperature $T_{shut}$.

In other words, the present inventors have found that there is a relation between the value of the activation energy at least in the case of a bolometric material made of amorphous silicon or of a silicon-germanium alloy and its electric resistance. Knowing the variation of the electric resistance caused by a drift of the intrinsic characteristics of the bolometric material, it is thus possible to estimate a corresponding variation of coefficient TCR, and thus to recalibrate the gain table without for all this implementing conventional procedures of empirical recalibration based on reference black bodies.

The present invention thus advantageously exploits said relation. It should be understood that to there are many ways of exploiting a mathematical relation according to the signals available at the output of the read circuits, to the calculation power, or to the memory space of the calculation units embarked in the cameras, to the type of analog circuit used, etc.

The present invention thus covers the direct or indirect use of this relation in the context of the determination of a gain table. Especially, the present invention involves estimates of quantities, given that these quantities are generally not measured directly, but rather estimated according to the signals available at the retina output and to various operating parameters of the detector, such as for example parameters relative to the type of polarization used, or to the type of architecture used to "read" the retina bolometers.

It should further be noted that the present invention involves temperatures. As more clearly appears hereafter, the various relations concern or directly derive from the temperature behavior of the actual bolometers. Theoretically, thus, the temperatures are those of the bolometers. The temperature of a bolometer is typically measured by measuring its resistance. It will however then be impossible to discriminate the effect of the bolometer characteristic drift which is to be corrected. In this context, it is necessary to estimate the temperature with other means. For example, a temperature probe may be provided close to each bolometer, or one or several temperature probes may be provided to measure the substrate temperature at one or several points thereof. Indeed, the bolometer membranes are in thermal relation with the substrate supporting them, and are thus in equilibrium therewith, that is, at an average temperature close to that of the substrate.

"Average temperature" is here used to designate the effective temperature on a time scale for example ranging from a few seconds to a few minutes. It is known that the instantaneous temperature (typically at the scale of a few microseconds) of the membrane of a bolometer is capable of having fast variations by a few degrees at the read electric pulse, under the effect of the Joule effect self-heating which occurs once per frame in the most frequent case of the signal forming by line by line scanned mode biasing, such as described hereafter. The equilibrium in steady state (after several frames) between phases of self-heating due to the reading and of thermal relaxation between frames towards the substrate temperature leads to consider an average temperature generally greater by a few degrees than that of the substrate. This difference also appears in the case of a continuous polarization, for which the average and instantaneous temperatures are equivalent.

This average temperature difference is substantially constant, at least as long as the read stimuli to are not modified.

In particular, it appears in the so-called "previous" state as well as in the state called signal "acquisition" state in the above discussion, so that it is not necessary in the general case to know it to obtain a very fine correction according to the present invention. If need be, for example, to refine the correction, this difference could be estimated and integrated in the implementation of the method according to the present invention, for example, in the form of a correction of quantities $T_{ref}$ and $T_{shut}$.

Due to its very principle, the temperature of the bolometer depends on the incident radiation, that is, on the temperature of the observed scene, so that this scene temperature contributes to defining the average bolometer temperature. However, this contribution remains much smaller than that of the supporting substrate, currently on the order of one hundred times less. As a result, at least in the case where the so-called "previous" and signal "acquisition" times correspond to scenes having a temperature which is not too remote from the bolometer temperature, for example, less than 20° C., there is no substantial distortion of the quality of the correction according to the present invention. This condition is typically obtained when the camera is equipped with a shutter, due to the fact that the inside of the camera is usually roughly isothermal. "Roughly" for example means that the substrate may itself have a higher average temperature than other portions of the camera, including the shutter, if present, due to the heat dissipation specific to its operation.

Such small differences can be neglected in a satisfactory implementation of the present invention. For larger temperature differences, a correction of lower quality but which however enables to decrease the above-described ghost image phenomena can be observed.

Advantageously, the bolometer temperature is thus approximated by the substrate temperature, which is a satisfactory estimate in the context of the present invention. Thus, the measurement of the temperature of the substrate at a point thereof may be considered, from the viewpoint of bolometers, as a satisfactory approximate of their temperature. In the following, for clarity and brevity, no particular distinction will be made between the bolometer temperature and the temperature at a point of the substrate, the nature of the used temperatures distinctly appearing from the context. Further, and in accordance with usual notations in the field, the substrate temperature may also be designated as the "focal plane temperature" since the substrate is placed in the focal plane of an optical system equipping the bolometric detector or "detector to temperature".

However, in the case where a non-negligible spatial temperature gradient, permanent or transiently variable, would appear on the substrate portion supporting the sensitive retina, it is advantageous to have several temperature probes at multiple points of the substrate enabling to obtain an estimate of the substrate temperature close to each bolometer. This estimate is for example directly provided in a simple manner by the signal from the probe closest to a given bolometer, with a spatial probe distribution according to a regular network of much lower density than the bolometer array. This network for example has a square or hexagonal mesh, and extends at least over a portion of the substrate supporting the sensitive retina.

As a more refined variation if need be, this estimate is obtained by means of a model of interpolation between the probe network points.

To limit the number of probes necessary to obtain a sufficiently fine estimate of the local substrate temperature, and which advantageously avoids the insertion of probes into the area occupied by the regular read circuits arranged in the sensitive retina area, one for example arranges, at various points peripheral to the sensitive retina, a plurality of probes each providing a local measurement of the substrate temperature. The temperature signal(s) are conventionally exported to the output, for example and typically, after digitization and integration, to the video data flow. The estimate of the spatial temperature distribution of the substrate in the vicinity of each bolometer is then obtained by means of a thermal model of the detector integrated in the correction algorithm according to the present invention.

Quantities $T_{ref}$ and $T_{shut}$ appearing in the derived expressions according to the present invention, in case one of the previous specific arrangements or their variations capable of being established by those skilled in the art without departing from the spirit of the present invention are implemented, are to be replaced with tabulated quantities $T_{ref}(i,j)$ and $T_{shut}(i,j)$.

According to the state of the art, the application of a gain table is intended to substantially cancel the effect of raw response dispersion Resp of each bolometric element of the retina around average value $\overline{Resp}$ of the responses of all retina elements.

Thus, it is usually agreed that the gain table is "normalized", that is, that its average value is by convention equal to 1.

Average responsiveness $\overline{Resp}$ calibrated as explained hereabove enables to have a scene temperature correspond to the corrected signal, if necessary for the application (case of thermography, for example). Corrected signal $S_{corr}$ provided for each bolometer of the retina by the camera in service is then transformed into thermometric signal $\theta_{scene}(i,j)$, or any other signal of interest to be provided, by the following relation:

$$\theta_{scene}(i,j)=f(S_{corr}(i,j),\overline{Resp}) \qquad (3)$$

Typically, for systems of the state of the art having a focal plane which is not temperature-regulated, it is usually necessary to measure and store in factory a series of average responsivenesses $\overline{Resp}$ at several characteristic temperatures of the camera or, more easily, of the focal plane (TPF). In other words, it is usual to empirically establish the curve of responsiveness $\overline{Resp}(TPF)$ according to the temperature of focal plane TPF, this curve being intended to provide in operation a relevant average response value at any camera temperature, for example, by interpolation.

The responsiveness variations due to the variations of $R_{ac}$ and of TCR with the camera temperature are comprised in the forming of this empirical factory calibration curve.

The same may be done for the gain table at these same temperatures, to store a series of tables $G_{ref}$ intended for a subsequent interpolation in operation, to base the corrections according to the present invention on a more accurate table $G_{ref}(TPF)$.

However, at least in the case of detectors based on amorphous silicon, or on amorphous silicon-germanium alloys, it can advantageously be observed that it is not necessary to acquire several gain tables. On the contrary, it can be observed that a gain table obtained in the initial phase of calibration at a temperature $T_{ref}$ remains substantially relevant, apart from the problems that the present invention aims at solving, whatever the subsequent operating temperature.

However still, at least in the case of detectors containing amorphous silicon or amorphous silicon-germanium alloys, it can advantageously be observed that at least in the case of a limited temperature excursion around the central or most probable value of the field of use, this curve needs not be acquired. The acquisition of average responsiveness value $\overline{Resp}_{ref}$ at a unique temperature $T_{ref}$ is sufficient, provided to perform a subsequent correction in operation of the average responsiveness by multiplication with scalar normalization factor $N=\overline{g(i,j)\cdot G_{ref}(i,j)}$ of the corrected gain table. This results in a substantial simplification of the initial calibration protocol and thus in the cost of this operation, given that it is no longer needed, as indicated, to acquire several gain tables during the calibration.

In this specific thermographic context, the direct knowledge of the variation of the calibration without it being necessary to measure its variations according to temperature is thus advantageous. Indeed, scalar N may be directly used as a relevant corrective of the average response, that is, implemented at the level of relation (3).

Document FR 2 936 052 does not use normalized gain tables G(i,j) which only contain the relative responsiveness dispersion, but rather sized tables of the responsiveness (or sensitivity S), directly connecting the signals formed from each element of the retina to the scene temperature variations. Quantities S(i,j) of the prior document thus correspond to quantities $G(i,j)\cdot\overline{Resp}$ of the present document. In the present document, the dispersive spatial corrections thus appear on gain table G(i,j), and the calibration corrections (responsiveness/sensitivity) appear, if used, in normalization factor N according to a general responsiveness correction $Resp_{shut}=Resp_{ref}\cdot N$. Factor N supports the corrections of the general drift of characteristics of the bolometric retina, and/or of the average temperature drift in non-regulated systems.

The present inventors have observed, as illustrated in FIG. 1, that the residual calibration error after correction according to the technique described in document FR 2936052, in the case where the temperature of the camera, and thus of the shutter, at the time of the last calibration of the gain table is very different from that of the subsequently-observed scene, forms clear local distortions in direct relation with the areas which have been previously strongly irradiated. It is thus useful to correct the calibration error beyond a simple "first order" correction of the gain table provided in said document.

Relation (1) expresses a double dependency of responsiveness to the bolometric material used, that is, on the one hand, a dependency on resistance $R_{ac}$, and on the other hand a dependency on temperature variation coefficient TCR.

The teachings of document FR 2936052 correct the dependency of responsiveness to resistance $R_{ac}$.

The concept underlying the present invention is to also take into account the dependency of responsiveness to coefficient TCR to correct general or local drifts of the retina "at the second order".

The present invention thus comprises also applying a second-order correction to a previously-acquired gain table $G_{ref}(i,j)$ to obtain a corrected gain table $G_{shut}(i,j)$ according to relation:

$$G_{shut}(i,j) = \left[G_{ref}(i,j) \cdot \frac{R_{ac\_shut}(i,j)}{R_{ac\_ref}(i,j)} \cdot \frac{TCR_{ref}(i,j)}{TCR_{shut}(i,j)}\right] / N \quad (4)$$

where:
$G_{shut}(i,j)$ is the new gain table, determined for current temperature $T_{shut}$ of the detector;
$R_{ac\_shut}(i,j)$ are the bolometer resistance values at the time of determination of new gain table $G_{shut}(i,j)$ and for temperature $T_{shut}$ at that time;
$R_{ac\_ref}(i,j)$ are the bolometer resistance values at the time of determination of gain table $G_{ref}$ and for temperature $T_{ref}$ at that time; and $TCR_{ref}(i,j)$ are the values of the temperature variation coefficients at the time of determination of gain table $G_{ref}$ and for temperature $T_{ref}$ at that time;
$TCR_{shut}(i,j)$ are the values of the temperature variation coefficients at the time of acquisition of new gain table $G_{shut}(i,j)$ and for temperature $T_{shut}$; and
N is a normalization factor advantageously equal to the average of all the numerator elements.

However, implementing a correction of the gain table using relation (4) is not simple. Indeed, this assumes to have means for measuring resistances $R_{ac}$ at temperature $T_{shut}$ when the shutter is closed. This operation can be considered as accessible, although this implies for the configuration of the read circuit and its forming to be provided for this purpose.

This operation also requires acquiring coefficients TCR at temperature $T_{shut}$ at the closing of the shutter. Coefficients TCR being strongly temperature-dependent, the direct acquisition of their value in operation requires taking the focal plane of the camera, and thus the retina, to two different temperatures, for example and typically by means of a Peltier cooler (or "TEC", "thermo electric cooler"). The TCR values of each bolometer are then extractable from two resistance measurements, with a closed shutter, obtained at these two temperatures. In addition to the redhibitory fact that more and more commercial detectors have no Peltier cooler, this operation is necessarily highly time-consuming, and would be very delicate at an operational level to obtain the required accuracy, since a "second-order" correction is desired.

The present invention thus provides a method of second-order correction of general or local drifts of the retina which is also valid for detectors which are not temperature-regulated, and which does not require for the measurements to be performed at the same temperature, although, of course, the present invention may also very well be applied in such conditions.

More specifically, the present invention provides determining the gain table at the current detector temperature and having any reference to coefficients TCR disappear from the analytic model(s) used.

The present invention is based on a previously-acquired gain table, and this, even if this table has been acquired at another temperature, including a temperature very distant from the current detector temperature. As will be detailed hereafter, this working hypothesis is surprisingly harmless for the quality of the second-order correction of the bolometer drift.

Then, in the usual case where the bolometric material used to form the bolometric resistance is of semiconductor type, like for example amorphous silicon and amorphous silicon and germanium alloys, resistance $R_{ac}$ of a bolometer has a know temperature behavior according to an Arrhenius equation:

$$R_{ac}(i,j) = R_{ac0}(i,j) \cdot \exp\left(\frac{Ea(i,j)}{k \cdot T}\right) \quad (5)$$

where:
Ea(i,j) is the activation energy of the resistivity of the bolometric material of the bolometer;
$R_{ac0}(i,j)$ is the asymptotic resistance parameter for an "infinite" temperature of this material;
k is Boltzmann's constant; and T is the temperature of the bolometric material of the bolometer.

This relation enables to express coefficient $$TCR(i, j) = \frac{1}{R_{ac}(i, j)} \cdot \frac{\partial R_{ac}(i, j)}{\partial T}$$

according to relation:

$$TCR(i, j) = -q \cdot \frac{Ea(i, j)}{k \cdot T^2} \quad (6)$$

where q is the charge of the electron, necessary when Ea is expressed in electron-Volts.

Then, the inventors have observed that at least in the case of amorphous silicon materials (a-Si) and of amorphous silicon and germanium alloys (a-Si$_x$Ge$_{1-x}$), activation energy Ea depends on various intrinsic characteristics of the specific considered material, and that if these characteristics do not change, that is, if the material does not drift, activation energy Ea has a substantially constant temperature through the entire range of detector operating conditions. By combining relations (4) and (6), relation (4) can thus be reformulated according to relation:

$$G_{shut}(i, j) = \left[ G_{ref}(i, j) \cdot \frac{R_{ac\_shut}(i, j)}{R_{ac\_ref}(i, j)} \cdot \frac{Ea_{ref}(i, j)}{Ea_{shut}(i, j)} \cdot \frac{T_{shut}^2}{T_{ref}^2} \right] / N \quad (7)$$

where $Ea_{ref}(i,j)$ and $Ea_{shut}(i,j)$ respectively are the bolometer activation energies at the time of determination of table $G_{ref}(i,j)$ and at the time of determination of new table $G_{shut}(i,j)$.

According to relation (7), the useful information relative to the second-order correction is thus now contained in activation energies Ea.

Then, the Applicant has found that activation energy Ea substantially reversibly and repeatably follows the resistivity of the bolometric material, when the latter is made to change for a reason other than a temperature variation. For a given temperature of the material, it is thus possible to estimate the variation of activation energy Ea of a bolometer by means of the variation of resistance $R_{ac}$ thereof.

More specifically, when a same bolometer of initial resistance $R_{ac\_init}(i,j)$ for temperature $T_{init}$, is modified because of a drift, and acquires a new resistance value $R_{ac\_final}(i,j)$ for this same temperature $T_{init}$, which will be noted $R_{ac\_final}(i,j)$, it has been observed that respective activation energies $Ea_{init}(i,j)$ and $Ea_{final}(i,j)$ of the bolometer before and after the drift substantially comply with the following relation:

$$Ea_{final}(i, j) - Ea_{init}(i, j) = K(T_{init}) \cdot \ln\left(\frac{R_{ac\_final}(i, j)}{R_{ac\_init}(i, j)}\right) \quad (8)$$

or as a variation:

$$\frac{Ea_{final}(i, j)}{Ea_{init}(i, j)} = 1 + \frac{K(T_{init})}{Ea_{init}(i, j)} \cdot \ln\left(\frac{R_{ac\_final}(i, j)}{R_{ac\_init}(i, j)}\right) \quad (9)$$

where K is a predetermined factor. The value of factor K is for example experimentally calibrated for the material used to form the retina, by imposing an intentional drift of various amplitudes to one or several bolometers of a calibration device, by measuring the resistances and the activation energies associated with these various drift states, and by extracting factor K from these measurements by usual methods of linearization of relations (8) or (9).

In relation (9), the resistance ratio is given at $T_{init}$, this value may be arbitrarily set to $T_{final}$, the important point being to compare resistances at a same temperature. In the following, the common temperature used to establish the gain table correction formulas will correspond to final temperature $T_{final}$.

For the amorphous silicon variety commonly used by the Applicant, a value of factor K on the order of 0.055 eV is typically relevant. For other materials, other values of this order of magnitude may be better adapted.

As indicated in relations (8) and (9), it may be useful, in relation with the specific behavior of the sensitive material used, or/and in case of an extreme excursion of the detector operating temperature, to express a possible variation of parameter K according to the temperature of the sensitive element. The previous experimental calibration of behavior K(TPF) of the sensitive material according to the temperature of focal plane TPF thus enables to refine in relations (8) and (9) the value of correction parameter K thus noted K(TPF), for example, by means of a polynomial expression. However, in most cases of use of amorphous silicon or amorphous silicon-germanium alloys, this refinement is superfluous and the use of a constant parameter K is adequate.

It should be noted that relations (8) and (9) by no means impose a predefined generic link between the value of resistance $R_{ac}$ and the value of coefficient TCR or the value of activation energy Ea. In other words, relations (8) and (9) are by no means a reformulation of the Arrhenius equation expressed by relation (5). Indeed, asymptotic resistance $R_{ac0}$ and activation energy Ea have no fixed or predetermined value and depend on the specific momentaneous state of the bolometric material. Thus, for example, when the activation energies of bolometers considered to as identical, that is, formed of a sensitive material obtained according to a constant method, or even sampled from a single experimental series, and having a substantially similar resistance, are measured, a dispersion of results, apart from the metrologic error, on the order of a few % can be observed. The same occurs when the activation energy of a series of bolometric devices after an intense irradiation, their resistance $R_{ac}$ having been modified, and however deemed to be identical, is measured.

Further, the present inventors have observed that the implementation of unique empirical relations (8) and (9) between activation energy Ea and resistance $R_{ac}$ to provide the second-order gain correction which is the object of the present invention remains valid at least across the variation range of $R_{ac}$ linked to the bolometer drift, observed by the Applicant as being, in the most extreme cases generally encountered, on the order of 10% of the value of resistance $R_{ac}$ of the bolometers at the putting into service of the camera.

By combining relations (5), (7), and (9), relation (7) may be reformulated according to relations:

$$G_{shut}(i, j) = \frac{G_{ref}(i, j) \cdot \alpha(i, j) \cdot \beta(i, j)}{N} \quad (10)$$

$$\alpha(i, j) = \frac{R_{ac\_shut}(i, j)}{R_{ac\_ref}(i, j)}$$

$$\beta(i, j) = \frac{1}{1 + \frac{K(T_{shut})}{Ea_{ref}(i, j)} \cdot \ln\left(\frac{R_{ac\_shut}(i, j)}{R_{ac\_ref}(i, j) @ T_{shut}}\right)} \cdot \frac{T_{shut}^2}{T_{ref}^2}$$

with:

$$R_{ac\_ref}(i, j) @ T_{shut} = R_{ac\_ref}(i, j) \cdot \exp\left(\frac{q \cdot Ea_{ref}(i, j)}{k} \cdot \left(\frac{1}{T_{shut}} - \frac{1}{T_{ref}}\right)\right) \quad (11)$$

Ratios $\alpha(i,j)$ and $\beta(i,j)$ are respectively called first-order and second-order correction factors of the drifts undergone by the bolometers.

Thereby, a corrected gain table of the focal plane temperature variations and of the general and local drift of the bolometers is obtained.

Thus, knowing a gain table and initial resistance and activation energy values, it is possible at any time and at any temperature of the detector to determine a new gain table and thus to take into account at the second order the bolometer drifts, for example due to too intense an illumination.

BRIEF DESCRIPTION OF THE DRAWINGS

The present invention will be better understood on reading of the following description provided as an example only and where the same reference numerals designate the same elements, among which.

DETAILED DESCRIPTION

Embodiments of the present invention applied to a specific bolometric detector which imposes specific signals S(i,j) or NC(i,j) due to the involved electronic circuits will now be described. It is however specified that the specific parameters and quantities which are then used in relation with these circuits are non-limiting and are only a specific application of the present invention.

Figure 2:
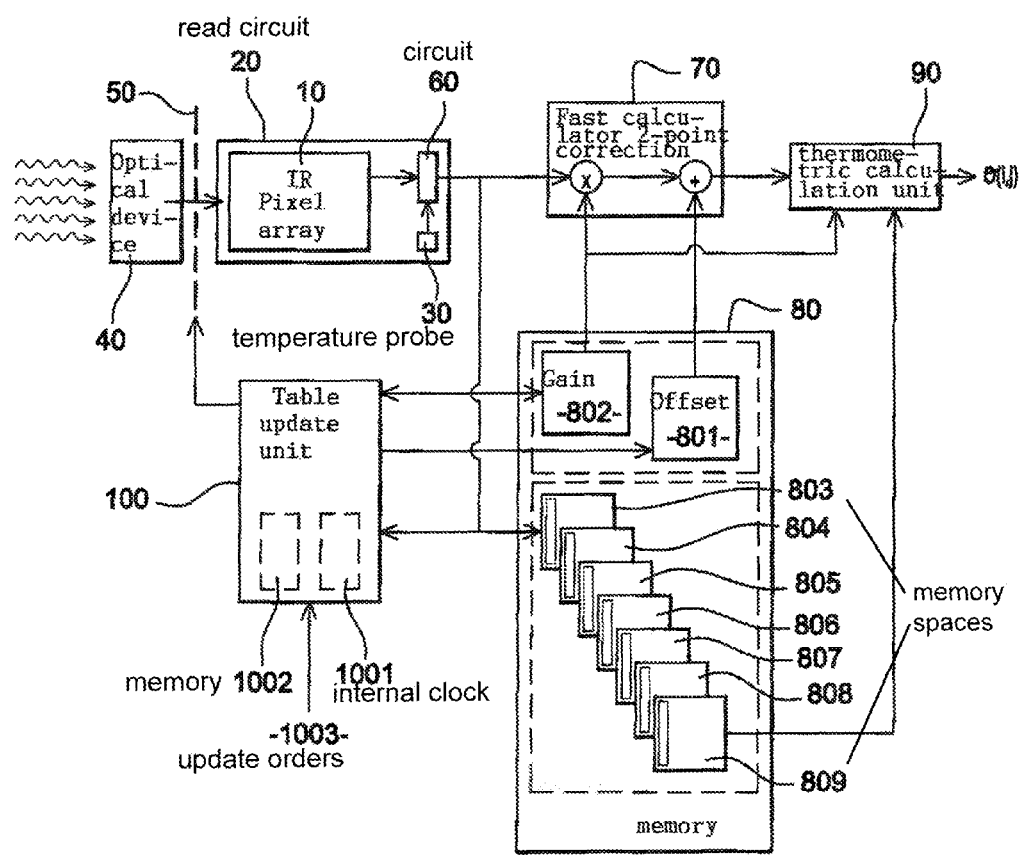
FIG. 2 is a simplified general view of a detector implementing the method according to the present invention.

FIG. 2 schematically illustrates a bolometric detector according to the present invention. This detector does not have a regulated temperature, the temperature of its focal plane being thus free to vary, and it detects the radiation of a scene to be observed in infrared.

The detector comprises an array 10 of elementary heat detectors, or bolometers, each comprising a bolometric membrane suspended above a substrate by supporting, polarization, and thermal insulation arms.

A read circuit 20 as well as at least one temperature probe 30 are further formed in the substrate, and the suspended bolometer membranes altogether form an array retina arranged in the focal plane of an optical device 40. A drivable shutter 50 is further provided in the optical path between optical device 40 and bolometer array 10. Read circuit 20 provides a digital video flow representative of the thermal image of the observed scene formed by optical device 40 and temperature probe 30 provides a digitized signal representative of the measured temperature and associated with the video flow. The output signals of circuit 20 are for example managed by sampling-blocking and multiplexing by means of a circuit 60, as known per se in the state of the art.

The output data of read circuit 20 form "raw" data, that is, with no analog or digital processing aiming at correcting the bolometer defects. A pixel of an image of the video flow delivered by circuit 20 thus corresponds to raw value S(i,j) or NC(i,j) (facing a uniform scene) originating from a bolometer.

Figure 3:
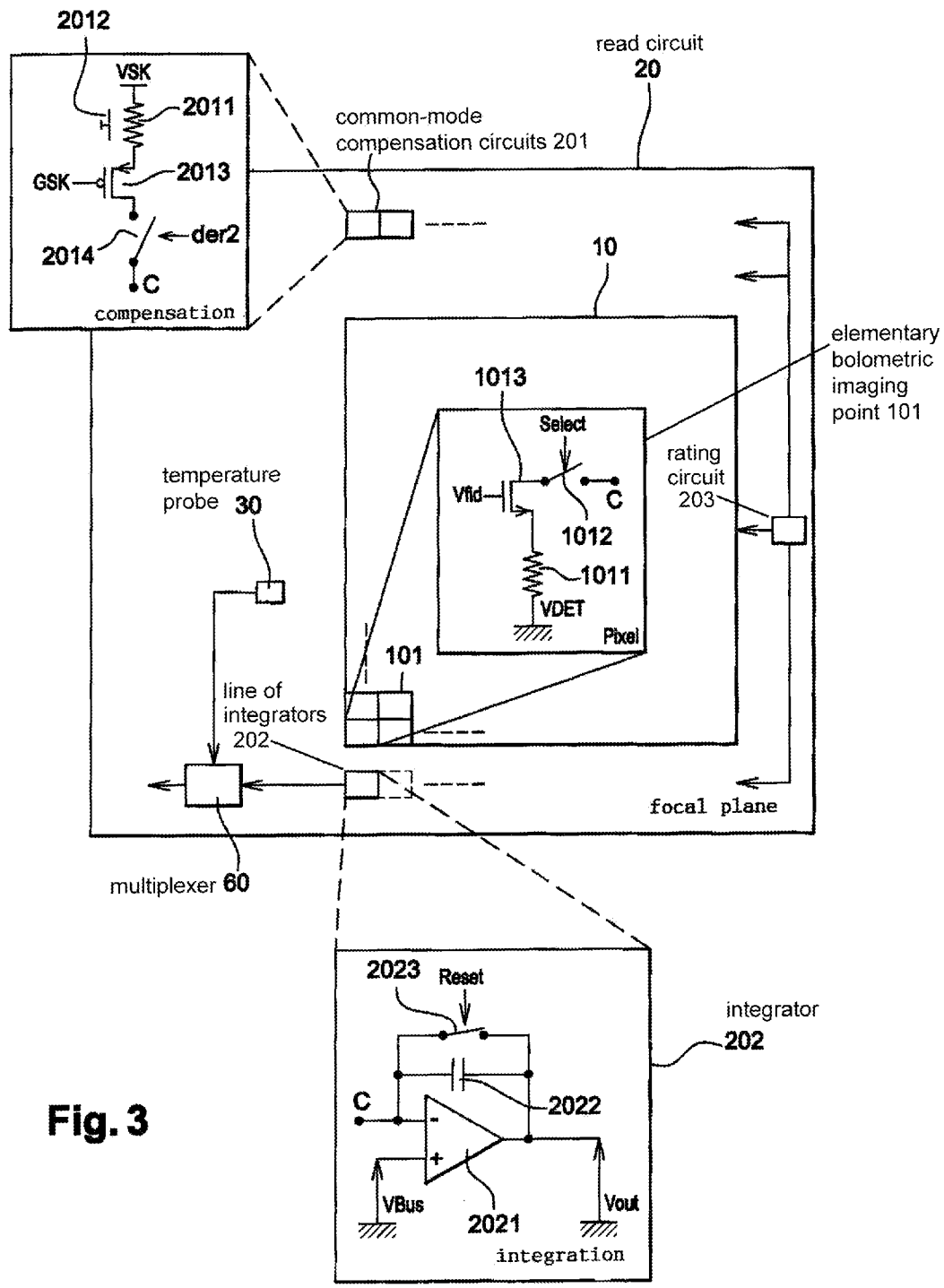
FIG. 3 is a simplified view of the bolometer array and of the read circuit comprised in the detector of FIG. 2.

FIG. 3 is a more detailed view of bolometer array 10 and of read circuit 20. This assembly comprises:

a bidimensional array 10 comprising n lines and m columns of elementary bolometric imaging points 101, or "pixels", each comprising a resistive imaging bolometer 1011, where n and m are integers greater than or equal to 1;

a line of common-mode compensation circuits 201, each associated with a column of array 10;

a line of integrators 202, each associated with a column of array 10; and a circuit 203 of rating and line-by-line addressing of array 10.

As known per se, imaging bolometers 1011 are usually formed of a membrane suspended by supporting arms above the substrate when the various electronic elements necessary for the reading are formed. The bolometric material of the membranes is amorphous silicon (a-Si) or an amorphous silicon and germanium alloy (a-$Si_xGe_{1-x}$).

Each integration circuit 202 comprises:

an operational amplifier 2021 having its non-inverting terminal (+) set to a predetermined constant voltage VBUS;

a capacitor 2022 of predetermined capacitance $C_{int}$ connected between the inverting terminal (−) of amplifier 2021 and the output thereof; and a reset switch 2023 connected in parallel with capacitor 2022 and drivable by means of a signal "Reset" generated by rating circuit 203.

Each elementary point 101 of array 10 further comprises a read switch 1012 drivable by means of a signal "Select" and connected to the inverting terminal (−) of operational amplifier 2021 of the associated circuit 202, and a first injection NMOS transistor 1013 having its gate driven by a voltage VFID to impose a voltage Vac across bolometer 1011 and having its source connected to a terminal of bolometer 1011 and having its drain connected to the other terminal of read switch 1012. The other terminal of bolometer 1011 is connected to a constant potential VDET, for example, the detector ground.

Each circuit 201 of compensation of the common-mode current comprises a resistive compensation bolometer 2011 made of the same material as imaging bolometer 1011, of electric resistance $R_{av}$, essentially insensitive to the radiation emitted by the scene, for example, in that it has a low thermal resistance towards the substrate, and is provided, optionally or as a variation, with an opaque screen 2012. Compensation bolometer 2011 is connected at one of its terminals to a predetermined voltage VSK and at its other terminal to the source of a second PMOS injection transistor 2013 of circuit 201 having its gate driven by voltage GSK to impose a voltage $V_{av}$ across bolometer 2011. Compensation circuit 201 also optionally comprises a resistance measurement switch 2014 drivable by rating circuit 203 by means of a signal "Der2" and arranged between the drain of injection transistor 2013 and the inverting input (−) of operational amplifier 2021 of the associated integration circuit 202. The function of this switch will be described in further detail hereafter according to the embodiments of the present invention.

Of course, the biasing of pixels 101 and of circuits 201 may be inverted provided to invert the MOS transistor type.

A compensation circuit 201 and pixels 101 of array column 10 associated with the compensation circuit being connected to a current summation point C connected to the inverting input "−" of an operational amplifier 2021, the potential of this summation point is maintained at a reference potential equal, to within an offset voltage, to potential VBUS.

Typically, all bolometers 1011 of a same line of array 10 are biased and simultaneously "read" from, and the entire array 10 is scanned line after line by means of a sequential line addressing, a compensation circuit 201 being common to all pixels 101 of a same column.

In a read cycle of a line of imaging array 10 to determine the temperature of the scene that it detects, resistance measurement switches 2014 of compensation circuits 201 are in their on state and reset switch 2023 of each integration circuit 202, which is on during a preliminary reset cycle of capacitor 2022, is switched off by rating circuit 203. The latter then turns on switch 1012 for selecting pixels 101 of the line being read. The difference between current $i_{ac}$ crossing an imaging bolometer 1011 and $i_{av}$ crossing the associated compensation bolometer 1012 is then integrated by capacitor 2022 of the corresponding circuit 202. When a predetermined integration time period $T_{int}$ has elapsed since the turning on of read switches 1012, rating circuit 203 then turns them off. Output voltage $V_{out}$ of an integration circuit 202 is then provided by expression:

$$V_{out} = V_{bus} + \frac{1}{C_{init}} \int_0^{T_{int}} (i_{ac}(t) - i_{av}(t)) dt \quad (12)$$

Relation (12) may be equivalently written, at the first order, that is, admitting that currents $i_{ac}$ and $i_{av}$ are constant along integration time period $T_{int}$:

$$V_{out} = \left(\frac{V_{ac}}{R_{ac}} - \frac{V_{av}}{R_{av}}\right) \cdot \frac{T_{int}}{C_{int}} + V_{bus} \quad (13)$$

Voltages $V_{out}$ of the line being read are sent to circuit 60 for a sampling-blocking and multiplexing. Raw output signal NC associated with an imaging bolometer 1011 thus is, in the example illustrated herein, the sampled value of voltage $V_{out}$. For clarity, to avoid burdening notations, the analog values will be used in the algebraic relations hereafter, it being understood that in reality, digital values provided by an analog-to-digital converter (ADC) are rather used. According to this simplification, $V_{out}$=S or $V_{out}$=NC.

The temperature signal(s) of the substrate generated by temperature probe(s) 30 are also inserted in the data flow at the output of multiplexer 60 according to known techniques.

Such a bolometric detector structure is conventional and will not be explained any further hereafter. For more information, reference may usefully be made, for example, to document "*Uncooled amorphous silicon enhancement for 25 μm pixel pitch achievement*" by E. Mottin et al, Infrared Technology and Application XXVIII, SPIE, vol. 4820.

Referring again to FIG. 2, the detector according to the present invention also comprises a fast calculation circuit 70, such as for example a DSP ("digital signal processor") connected to the output of read circuit 20. Calculation circuit 70 applies to each image of the output flow of read circuit 20 a "two-point" offset and gain correction to correct offset and gain dispersions of bolometers 1011 of array 10 by means of an offset table 801 and of a gain table 802 of a memory unit 80 of the detector.

A calculation circuit 90 receives the corrected image flow and then determines a temperature $\theta_{scène}$ (or an output quantity of interest in relation with $\theta_{scène}$ if the application is not strictly thermographic) of infrared radiation IR incident on each imaging bolometer 1011 according to the corrected signals at the output of calculation circuit 70, to responsiveness Resp 809 of detector 10 with respect to the scene temperature, kept in a memory unit 80, as well as gain table 802.

A calculation unit 100 is further provided for the update of offset table 801 and gain table 802 and is connected to shutter 50, to read circuit 20, and to memory unit 80. For its operation, calculation unit 100 comprises an internal clock 1001 and a memory 1002 for storing its intermediate calculations. Unit 100 is also capable of receiving update orders 1003 from the user of the detector.

Of course, it should be understood that units 70, 80, 90, 100 may be used in one or several microprocessors, the implemented functions having been highlighted rather than the hardware that could be used in the illustrated example.

First Embodiment

Figure 4:
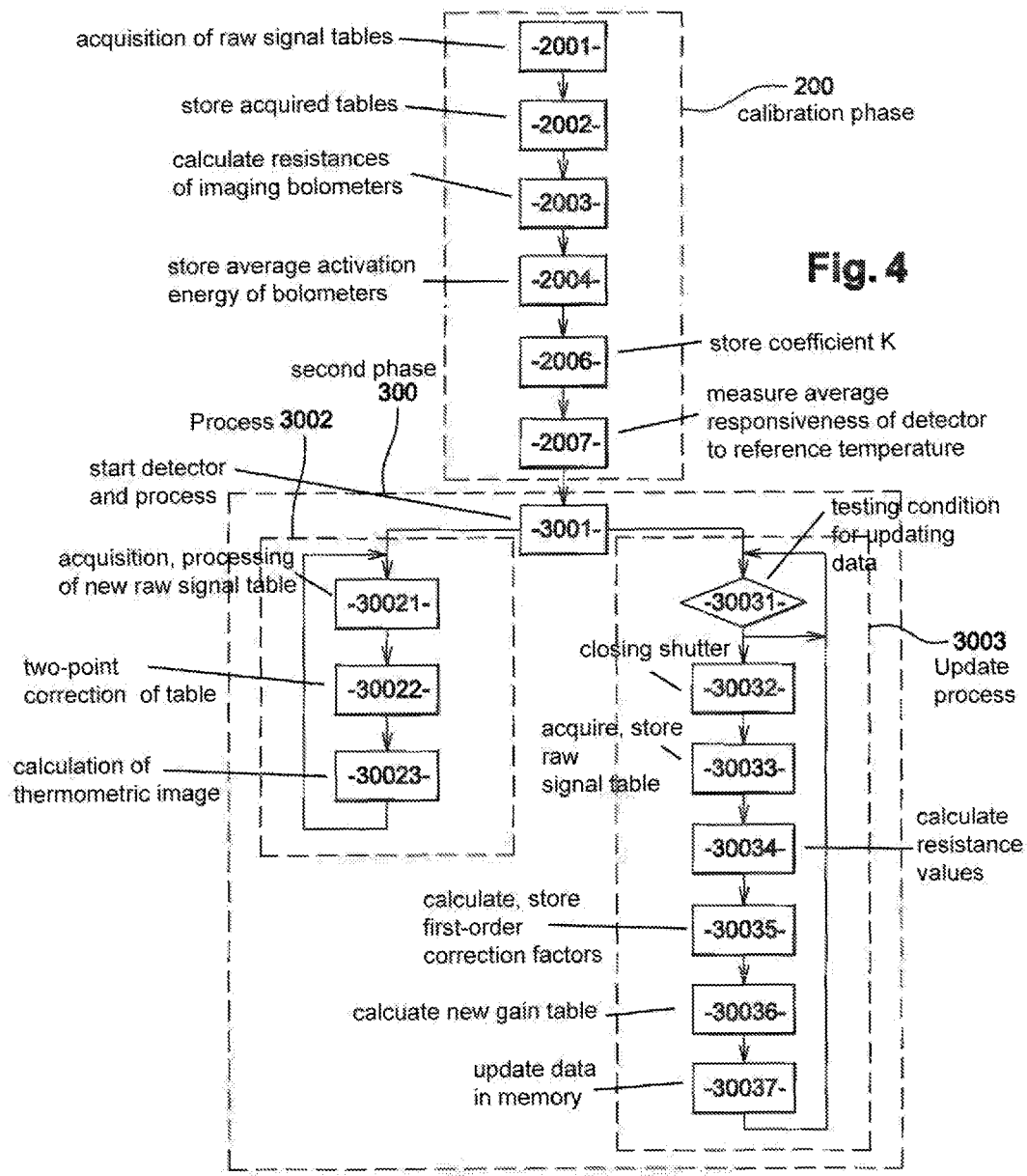
FIG. 4 is a flowchart of a method according to a first embodiment of the present invention.

A method according to a first embodiment implemented by the detector just described will now be described in relation with the flowchart of FIG. 4.

This first embodiment more generally applies to any type of detector implementing an estimate of the values of the resistances of imaging bolometers 1011 or of any quantities representative thereof. As will appear hereafter, the determination of a new gain table is independent from the specific parameters of the read circuit.

The method starts with a first factory calibration phase 200 aiming at obtaining the initial data enabling to subsequently determine a new gain table according to relation (10).

More specifically, calibration phase 200 starts with the acquisition, at 2001, of two tables of raw signals of bolometers 1011 of retina 10, when the camera is arranged in front of two black bodies taken to uniform temperatures T1 and T2, preferentially respectively designated as $NC_{T1}(i,j)$ and $NC_{T2}(i,j)$. Tables $NC_{T1}(i,j)$ and $NC_{T2}(i,j)$ are preferentially formed, as known per se, of the average value of several successively-acquired frames, typically at least ten successive frames, to filter dispersions due to the acquisition noise or inherent to the detector.

At 2002, one of the acquired tables, for example, table $NC_{T1}(i,j)$, is stored as the initial offset table 801 in memory 80. Algebraic average $\overline{NC_{T1}}$ of table $NC_{T1}(i,j)$, which is also used in the "two-point" correction is also stored in memory space 801. Table $NC_{T1}(i,j)$ and its average $\overline{NC_{T1}}$ are further stored in a space 803 of memory 80 as a raw reference signal table $NC_{ref}(i,j)$ and as reference average table $\overline{NC_{ref}}$.

Similarly, still at 2002, an initial gain or "reference" table de gains, is calculated according to relation $$G_{ref}(i,j) = \frac{\overline{NC_{T2}} - \overline{NC_{T1}}}{NC_{T2}(i,j) - NC_{T1}(i,j)}$$

and stored as an initial gain table in space 802 in memory 80. Table $G_{ref}(i,j)$ is also stored as a reference gain table in a space 804 of memory 80.

The substrate temperature during this calibration operation is also stored as a reference temperature $T_{ref}$ in a space 805 of memory 80. According to a more sophisticated form of estimate of this quantity by means of several temperature probes, a tabulated form $T_{ref}(i,j)$ of reference temperature $T_{ref}$ is established and stored in space 805.

Figure 5:
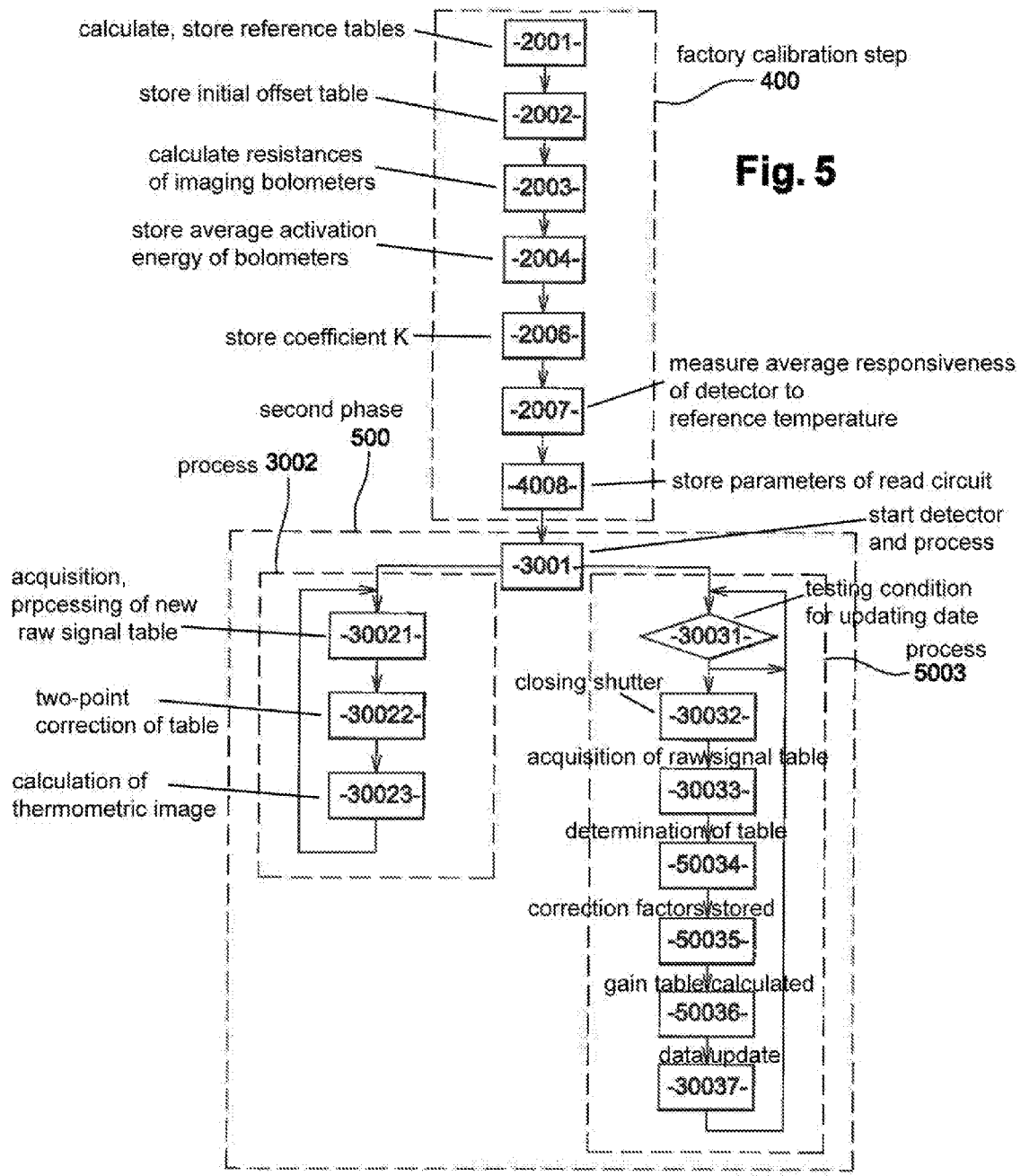
FIG. 5 is a flowchart of a method according to a second embodiment of the present invention.

At 2003, the value of resistances $R_{ac\_ref}(i,j)$ of imaging bolometers 1011 is calculated according to the parameters of read circuit 20 as known per se, for example by an implementation described in document FR 2936052 in relation with the embodiment of FIG. 5 of said document, by placing the camera in front of the black body of temperature $T_1$, and a to corresponding table of resistances is stored in a space 806 in memory 80. Especially, resistance measurement switches 2014 of compensation circuits 201 are switched to their off state by rating circuit 203, and bolometer array 10 is read line by line. At the end of an integration cycle, voltage $V_{out}$ with a bolometer of coordinates (i,j) at the output of integrator 202 is given by relation:

$$V_{out} = V_{bus} + \frac{1}{C_{int}} \int_0^{T'_{int}} i_{ac}(i,j)(t)dt$$

where $T'_{int}$ is a decreased integration time period selected to avoid saturating capacitor 2022 on measurement of the drift of an imaging bolometer 1011, and $i_{ac}(i,j)(t)$ is the instantaneous current flowing through the imaging detector.

Calculation unit 100 then determines an electric resistance $R_{ac\_ref}(i,j)$ of imaging bolometer 1011 according to voltage $V_{out}$, for example assuming that this resistance is substantially constant during the integration period, in which case $$V_{out} = \frac{V_{ac}}{R_{ac\_ref}(i,j)} \cdot \frac{T'_{int}}{C_{int}} + V_{bus}.$$

It is then easy to express $R_{ac\_ref}(i,j)$ by means of this linear relation and of the known parameters of the circuits and of the applied stimuli.

Other embodiments of the measurements of $R_{ac\_ref}(i,j)$ are applicable, even in the absence of switch 2014, for example, by successively applying two different voltages VFID, inducing two different biasings $V_{ac}$, or again by imposing two different integration times $T_{int}$. A linear first-order relation is then obtained between the obtained quantities $V_{out}$, and resistances $R_{ac\_ref}(i,j)$, from which a resistance measurement $R_{ac\_ref}(i,j)$, or at least a substantially proportional quantity, is extracted as will be further detailed hereafter.

At 2004, according to a preferred variation, average activation energy $\overline{Ea_{ref}}$ of bolometers 1010 of retina 10, previously empirically and generically acquired in a manner known per se, is stored in a space 807 of memory 80. Reference activation energies $Ea_{ref}(i,j)$ of bolometers 1011 are all assumed to be equal to average energy $\overline{Ea_{ref}}$.

For example, in the case of a bolometric material formed of a specific variety of amorphous silicon, $\overline{Ea_{ref}}$=0.170 eV.

According to another variation, activation energy $Ea_{ref}(i,j)$ of each imaging bolometer is to acquired in a manner known per se, for example, by measuring resistances $R_{ac}$ at two uniform focal point temperatures, typically distant by a few degrees C., and a reference activation energy table is stored in space 807 of memory 80. In the case where several temperature probes are available, this prior activation energy measurement is all the more accurate due to the fact that the temperature difference imposed between the two measurements of $R_{ac}$ is measured or modeled at any point of the retina.

At 2006, coefficient K of relations (8) and (9) is stored in a space 808 of memory 80. For example, in the case of a specific variety of bolometric materials formed of amorphous silicon, K=0.055 eV in a wide range of temperatures around 30° C.

Coefficient K is for example obtained by extracting, prior to the sequence of operations discussed herein, the slope of the experimental points linking activation energy Ea to the logarithm of the resistances, measured on a component having had its pixels locally modified by intense lighting, and thus for which the sensitive materials forming resistances $R_{ac}(i,j)$ have been more or less modified.

The extraction of the values of coefficient K may, as a possible complement, be extended over the full range of temperatures of interest, to obtain behavior curve K(TPF) according to the temperature of the focal plane. Such an empirical behavioral relation can then be expressed in analytic form, for example, polynomial. The various coefficients necessary to implement the present invention are in this case also stored in space 808.

The present inventors have however observed that parameter K(TPF) is not critical in terms of correction quality, to within +/−20%, even when the detector temperature widely varies, and/or the considered bolometer for example drifts by +/−10% in terms of resistivity (at constant temperature), which is a really extreme case.

It should be understood that the values provided for parameters $\overline{Ea_{ref}}$ and K(TPF) are an example only. Relevant values with respect to the specific material used as the thermometer of bolometer 1011 should be assigned to these parameters.

Finally, at 2007, average responsiveness $\overline{Resp_{ref}}$ of the detector to reference temperature $T_{ref}$, is measured in front of two black bodies taken to temperatures T1 and T2, and stored in a space 809 of memory 80. More specifically, average $\overline{Resp_{ref}}$ is calculated according to relation:

$$\overline{Resp_{ref}} = \frac{\overline{NC_{T2}} - \overline{NC_{T1}}}{T2 - T1} \quad (14)$$

As mentioned previously, the responsiveness is calibrated over the entire operational temperature range of the camera, so that a few points of curve $\overline{Resp_{ref}}$=f(T) are established and stored, $T_{ref}$ being but a specific point at which has been acquired, at 2003, resistance table $R_{ac\_ref}$. As also indicated, this step may be omitted if it is preferred to use corrective scale N for normalizing the gain tables resulting from the implementation of the present invention, at least in the case of bolometers containing amorphous silicon or silicon-germanium alloys.

The method then carries on with a second phase 300 implemented while the detector is in service. Second phase 300 comprises a step 3001 of starting the detector, which opens shutter 50 and starts a process 3002 of acquisition of a video flow of the observed scene.

Process 3002 comprises the acquisition, at 30021, of a raw signal table S(i,j) by read circuit 20 followed, at 30022, by a "two-point" correction of table S(i,j) by calculation circuit 70 according to relation:

$$S_{corr}(i,j) = G_{802}(i,j) \cdot (S(i,j) - NC_{801}(i,j)) + \overline{NC_{801}} \quad (15)$$

where $G_{802}(i,j)$, $NC_{801}(i,j)$ and $\overline{NC_{801}}$ respectively are the gain table stored in space 802 of memory 80, and the offset table and its average stored in space 801 of memory 80.

Process 3002 carries on with the calculation, at 30023, of a thermometric image (or more generally, an image "of interest") θ(i,j) by calculation circuit 90 based on corrected signal table $S_{corr}(i,j)$ delivered by calculation circuit 70 according to a relation of type $\theta^{scene}(i,j) = f(S_{corr}(i,j), \overline{Resp_{ref}})$.

Finally, step 30023 loops back on step 30021 for the acquisition and the processing of a new raw signal table.

Concurrently to process 3002 of video flow acquisition, starting step 3001 starts a process 3003 to of update of offset table 801, of gain table 802, and of average responsiveness 809 implemented by calculation unit 100.

Update process 3003 comprises a first step 30031 of testing the occurrence of a condition for updating the data. For example, calculation unit 100 tests whether an order has been emitted by the user to perform such an update, and/or if the time period elapsed since the last update is greater than a predetermined threshold duration, and/or if the substrate temperature delivered by temperature sensor 30 is different from the substrate temperature at the last update by more than a predetermined threshold value. The calculation unit may also implement a processing algorithm to determine whether retina 10 has been submitted to an intense illumination, implying a modification of the intrinsic characteristics of the bolometers thus overexposed, and thus a possible drift thereof.

If the substrate temperature is tabulated for each bolometer, according to a more sophisticated form of estimate of the quantity by means of the signal provided by several probes, the occurrence of an update condition relative to temperature may take into account several of these signals, or combinations of these signals together or with other parameters deemed to be useful or relevant in this context of interest of taking into account of the general or local temperature variations of the focal plane.

If one of the update conditions is fulfilled, process 3003 carries on with the closing, at 30032, of shutter 50. If the camera comprises no shutter, the system (and/or the user) will only engage step 30032 after a sufficient scene uniformity condition is fulfilled, or will activate any system intended to uniformize as much as possible the image sensed on the retina.

At 30033, a raw signal table $NC_{shut}(i,j)$ is then stored in memory 1002 of unit 100, this table being preferably formed of the average of several successive frames, for example, ten. The substrate temperature $T_{shut}$ delivered by sensor 30 at the time of acquisition of table $NC_{shut}(i,j)$ and algebraic average $\overline{NC_{shut}}$ of table $NC_{shut}(i,j)$ are also stored in memory 1002 of unit 100.

The process carries on, at 30034, with the calculation by unit 100 of resistance values $R_{ac\_shut}(i,j)$ according to a method for example provided in document FR 2936052 according to the parameters of read circuit 20, in a way similar to that described in relation with step 2003 by closing shutter 50.

Similarly, still at 30034, resistance values $R_{ac\_ref}(i,j) @T_{shut}$ are estimated as a function of resistance values $R_{ac\_ref}(i,j)$, of activation energies $Ea_{ref}$, and of temperature $T_{ref}$ stored in memory 80, as well as a of temperature $T_{shut}$ stored in unit 100. This estimate is for example implemented by using relation (11) directly in this form, or at least a digitized or linearized form thereof. It should be understood that $T_{ref}$ and $T_{shut}$ may also be tabulated.

Resistance values $R_{ac\_ref}(i,j) @T_{shut}$ and $R_{ac\_shut}(i,j)$ are stored in corresponding tables in memory 1002 of unit 100.

Then, at 30035, first-order correction factors $$\alpha(i,j) = \frac{R_{ac\_shut}(i,j)}{R_{ac\_ref}(i,j)}$$

are calculated and stored by unit 100.

Similarly, second-order correction factors β(i,j) are calculated and stored by unit 100, for example, by using relation β(i,j) of relation (10) directly in this form, or advantageously, especially for a greater calculation speed, by implementing a form of this relation linearized at the first order according to expression:

$$\beta(i,j) = \frac{1}{\left(1 + \frac{K}{E_{a\_ref}} \cdot \left(\frac{R_{ac\_shut}(i,j) - R_{ac\_ref}(i,j) @T_{shut}}{R_{ac\_ref}(i,j) @T_{shut}}\right)\right)} \cdot \frac{T_{shut}^2}{T_{ref}^2} \quad (16)$$

At 30036, a new gain table is then calculated by unit 100. The new gain table is then calculated according to relation:

$$G_{shut}(i,j) = \frac{G_{ref}(i,j) \cdot \alpha(i,j) \cdot \beta(i,j)}{N} \quad (17)$$

where normalization scalar N is the average value of all the numerator elements, which may advantageously be stored in the object for correcting the average responsiveness, as indicated previously.

Still at 30036, optionally, unit 100 calculates a new average responsiveness $\overline{Resp_{shut}}$ according to relation $\overline{Resp_{shut}} = \overline{Resp_{ref}} \cdot N$.

Finally, update 3003 ends, at 30037, with the update of the data of memory 80, that is:

the replacing of the current values of offset table $NC_{801}(i,j)$ and of its average $\overline{NC_{801}}$ stored in memory space 801 respectively with raw value table $NC_{shut}(i,j)$ and algebraic average $\overline{NC_{shut}}$ thereof;

optionally, the replacing of the average responsiveness value stored in memory space 809 with newly-calculated average responsiveness $\overline{Resp_{shut}}$;

the storage of data used for update start test 30031, especially temperature $T_{shut}$ and time-stamping data $H_{shut}$ of the update time, for example in memory 80;

the opening of shutter 50; and the looping back on test step 30031 to search for the occurrence of update starting conditions.

Of course, if a plurality of temperature probes is used at various points of the substrate, a tabulated form of parameters $T_{ref}$ and $T_{shut}$ will typically be used everywhere these parameters appear, as indicated.

As mentioned hereabove, the first embodiment of the present invention applies to detectors which enable to determine the value of the bolometer resistances. Such a determination may be a calculation performed according to the raw signals delivered at the read circuit output or by any other means. In particular, a detector comprising switches 2014 in compensation circuits 201 enabling to measure voltages $V_{out}$ only associated with imaging bolometers 1011 is described. Other resistance measurement architectures are possible. As a variation, rather than decreasing the integration time, the value of capacitance $C_{int}$ of capacitors 2022 is increased so that they do not saturate during an integration of duration $T_{int}$ used in the normal operation of the detector.

For example, each integrator 202 comprises two capacitors, a first one being selected by rating circuit 203 on reading of imaging array 10, and the second being selected on measurement of the resistance of imaging bolometers 1011.

Figure 1:
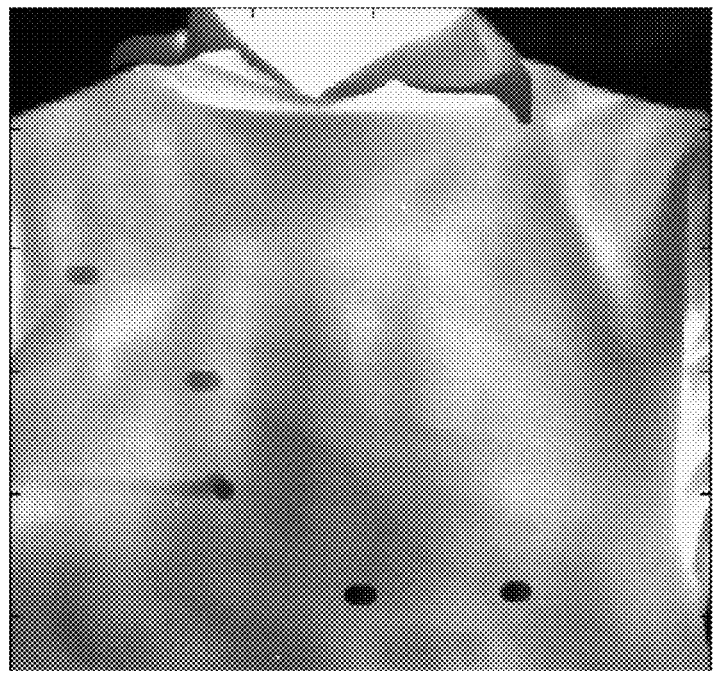
FIG. 1 is a thermal image of a scene, obtained by means of a bolometric infrared detector previously intentionally exposed at various points to solar radiations, in conditions where the shutter and the scene are taken to temperatures distant by approximately 30° C., and corrected according to a first-order correction of the state of the art.

As a variation, the architecture described in document FR 2936052 in relation with FIGS. 1 and 2, measuring the difference between the resistance of imaging bolometers and of known reference resistors, is used to measure the resistances of imaging bolometers 1011.

It should however be specified that it is not needed to estimate actual resistances $R_{ac\_shut}(i,j)$ to implement the first embodiment. Indeed, gain tables $G_{shut}(i,j)$ are invariant when the scale of ratios of "$R_{ac}$" introduced into the previous relations is spatially uniform. The use of any resistance measurement protocol provides the expected result, provided for the proportionality of the result of this protocol with respect to resistance $R_{ac}$ to be at least approximate, and for said protocol to be spatially reproducible for all the retina bolometers.

Such conditions are satisfied for example according to the teachings of document FR 2936052 by means of specific circuits, for example comprising a switch 2014 for opening the compensation branch and/or the reference resistances, or again by means of a specific protocol such as the use of two bias voltages or two different integration times as indicated previously.

The detector especially described in relation with FIG. 3 however remains a specific application, through preferred, of the first embodiment.

It should be understood that the first embodiment also applies to detectors having circuits of different biasings, for example, current-biasing circuits or different common-mode compensation circuits. The first embodiment of course also applies to temperature-regulated detectors, in which case the measurement of the substrate temperature is optional, temperature $T_{shut}$ being identical to temperature $T_{ref}$ which is the object of the temperature regulation. The previous relations are then accordingly simplified, and especially comprise no temperature ratio and do not require estimating values $R_{ac\_ref}(i,j)@T_{shut}$ which are by definition equal to values $R_{ac\_ref}(i,j)$.

Second Embodiment

The present invention also applies to detectors which comprise no software and/or hardware means for determining the values of the bolometer resistances, which enables to apply the present invention to detectors of the state of the art with no modification of the actual detector or to the proximity hardware and software, for example, for driving and formatting raw signals.

The second embodiment of the present invention is now described in relation with the timing diagram of FIG. 5, and also in application of a detector identical to that of FIGS. 2 and 3, to with the difference that it typically does not comprise resistance measurement switches 2014, or generally which comprises no hardware and/or software means enabling to obtain in service an estimate of the individual values of the resistances of bolometers 1011.

The problem of the second embodiment, as compared with the first previously-discussed mode, is posed by the absence, in service, of a direct resistance measurement, for example substantially proportional, or indirect, for example, substantially linear. Indeed, this measurement enables to directly quantify, for each imaging bolometer 1011, the amount of resistance variation that can be imputed to a true drift, that is, to which a variation of Ea is associated. In the first previously-described embodiment, the consequence of a variation of the camera temperature, which implies no significant variation of the activation energy, is thus differentiated from an intrinsic resistivity variation of a specific bolometer 1011, to which corresponds an activation energy variation computable due to relations (8) or (9).

It is now necessary, in the absence of a quantity directly usable to estimate each resistance, to form for each bolometer 1011 of retina 10 a quantity to which a second-order correction is to be relevantly applied.

It should first be noted that the value of term $\Delta NC(i,j) = NC_{shut}(i,j) - NC_{ref}(i,j)$, between a current time of substrate temperature $T_{shut}$ and a subsequent time of substrate temperature $T_{ref}$, partly depends on the drift of bolometers 1011 and thus comprises information relative thereto. The second embodiment thus provides extracting from term $\Delta NC(i,j)$ most of the component associated with the intrinsic drift, that is, with no temperature variation, of bolometers 1011.

Referring to relation (13), term $\Delta NC(i,j)$ can be written at the first order according to relation:

$$\Delta NC(i,j) = \frac{T_{int}}{C_{int}} \cdot \left( \left( \frac{1}{R_{ac\_shut}(i,j)} - \frac{1}{R_{ac\_ref}(i,j)} \right) \cdot V_{ac} - \left( \frac{1}{R_{av\_shut}(j)} - \frac{1}{R_{av\_ref}(j)} \right) \cdot V_{av} \right) \quad (18)$$

where $R_{av\_shut}(j)$ and $R_{ac\_ref}(j)$ respectively are the values of the resistances of compensation bolometer 2011 associated with the $j^{th}$ column of retina 10 at the time of acquisition of new read signals $NC_{shut}(i,j)$, and at the previous time of acquisition of read signals $NC_{ref}(i,j)$.

Differences $$\left( \frac{1}{R_{av\_shut}(j)} - \frac{1}{R_{av\_ref}(j)} \right)$$

linked to compensation bolometers 2011, which are blind and/or have a very low thermal resistance towards the substrate for two different temperatures $T_{shut}$ and $T_{ref}$ of the substrate, may be considered as uniform and may be considered as equal at the first order to a same value $\Delta_{av}$. Indeed, on the one hand, compensation bolometers 2011 undergo substantially no drift, and thus substantially keep their initial intrinsic state, and on the other hand, as previously indicated, the present inventors have observed that the activation energy dispersion is negligible between bolometers in the same state, at least for materials of amorphous silicon or amorphous silicon and germanium alloy type.

The use of several temperature probes provides the information necessary if need be to correct each difference associated with members $$\left(\frac{1}{R_{av\_shut}(j)} - \frac{1}{R_{av\_ref}(j)}\right)$$

common to each column, by the quantity associated with the temperature variation close to each compensation bolometer. For simplification, the more complex derivation of this case is not developed but may be undertaken.

Relation (22) thus simplifies into relation:

$$\Delta NC(i, j) = \frac{T_{int}}{C_{int}} \cdot \left(\left(\frac{1}{R_{ac\_shut}(i, j)} - \frac{1}{R_{ac\_ref}(i, j)}\right) \cdot V_{ac}\right) - \Delta_{av} \quad (19)$$

Then, to isolate the portion of term $\Delta NC(i,j)$ linked to the bolometer drift, the second embodiment is based on the comparison of this term with average $\overline{\Delta NC^{ND}}$ associated with imaging bolometers 1011 having not drifted at the time of acquisition of $NC_{shut}(i,j)$ and at temperature $T_{shut}$, that is, forming the differences according to relation:

$$\Delta NC(i,j) - \overline{\Delta NC^{ND}} \quad (20)$$

According to a first variation, it can be observed that generally, only a small fraction of imaging bolometers 1011 is concerned by the drift phenomenon to be corrected. This is typically the for large-format bolometers after observation of the sun over a limited time (for example, a few minutes), since at worst, a few % of the total number of bolometers 1011 are affected by the drift. In this case, it can be observed that $\overline{\Delta NC^{ND}} \approx \overline{\Delta NC}$ and $\overline{\Delta NC^{ND}} = \overline{\Delta NC}$ is then assumed in relation (20).

According to a second variation which more accurately estimates $\overline{\Delta NC^{ND}}$, which is for example useful when the detector is submitted to repeated irradiations, or to a high optical field that scan or concern a non-negligible relative surface of the retina, an identification of the bolometers having drifted, and thus of the bolometers which have not drifted, is implemented.

For example, a spatial selection managed by the software of imaging bolometers 1011 associated with the elements of the gain table having been submitted to a significant modification at the last update(s) of this table is implemented. The bolometers 1011 which have really drifted are thus identified for the ongoing update. Value $\overline{\Delta NC^{ND}}$ is then calculated by averaging the raw signals of the bolometers which have not drifted. A very accurate estimate of quantity $\overline{\Delta NC^{ND}}$, and thus of the second-order corrections to be applied is thus obtained. In other words, it is here provide to apply a selective spatial mask.

Further, quantity $\overline{\Delta NC^{ND}}$ may be analytically written according to relation:

$$\overline{\Delta NC^{ND}} = \frac{T_{int}}{C_{int}} \cdot \left(\left(\frac{1}{R^{ND}_{ac\_shut}(i, j)} - \frac{1}{R^{ND}_{ac\_ref}(i, j)}\right) \cdot V_{ac}\right) - \Delta_{av} \quad (21)$$

where $R_{ac\_ref}{}^{ND}(i,j)$ and $R_{ac\_shut}{}^{ND}(i,j)$ respectively are the values of resistances $R_{ac\_ref}(i,j)$ and $R_{ac\_shut}(i,j)$ at the time of acquisition of read signals $NC_{shut}(i,j)$ and at the previous time of acquisition of read signals $NC_{ref}(i,j)$ of the bolometers deemed not to have undergone the drift from among all the retina bolometers, that is, in the general case as indicated, most of the bolometer population.

By combining relations (20) and (21), one then obtains at the first order:

$$\Delta NC(i, j) - \overline{\Delta NC^{ND}} = \quad (22)$$

$$\frac{T_{int} \cdot V_{ac}}{C_{int}} \cdot \left(\left(\frac{1}{R_{ac\_shut}(i, j)} - \frac{1}{R^{ND}_{ac\_shut}}\right) - \left(\frac{1}{R_{ac\_ref}(i, j)} - \frac{1}{R^{ND}_{ac\_ref}}\right)\right)$$

Now, according to the general case, the dispersion of resistances $R_{ac\_ref}(i,j)$ is moderated, especially because these values correspond to the bolometer resistances ex factory while they have been submitted to no drift. Thus, term $$\left(\frac{1}{R_{ac\_ref}(i, j)} - \frac{1}{R^{ND}_{ac\_ref}}\right)$$

can be neglected.

A reorganization of equation (22) without this second term then provides the following relation:

$$\frac{\overline{R^{ND}_{ac\_shut}}}{R_{ac\_shut}(i, j)} = \frac{C_{int} \cdot \overline{R^{ND}_{ac\_shut}}}{T_{int} \cdot V_{ac}} \cdot \left(\Delta NC(i, j) - \overline{\Delta NC^{ND}}\right) + 1 \quad (23)$$

$\overline{R_{ac\_shut}{}^{ND}}$ being estimated over the bolometers having undergone no drift of their resistance, one has:

$$\overline{R^{ND}_{ac\_shut}} = \overline{R_{ac\_ref}} @ T_{shut} = \overline{R_{ac\_ref}} \cdot \exp\left(\frac{q \cdot Ea_{ref}}{k} \cdot \left(\frac{1}{T_{shut}} - \frac{1}{T_{ref}}\right)\right) \quad (24)$$

The ratio of relation (23) represents a relative variation between the resistances of bolometers 1011 which are not affected by a drift (represented by the average term at the numerator) and the resistances of the bolometers which have drifted (represented by the denominator table).

Factor $\alpha(i,j)$ can thus be expressed by using relation (24):

$$\alpha(i, j) = \frac{R_{ac\_shut}(i, j)}{R_{ac\_ref}(i, j)} \approx \frac{R_{ac\_shut}(i, j)}{\overline{R_{ac\_ref}}} = \frac{\frac{R_{ac\_shut}(i, j)}{\overline{R^{ND}_{ac\_shut}}} \cdot \exp\left(\frac{q \cdot Ea_{ref}}{k}\left(\frac{1}{T_{shut}} - \frac{1}{T_{ref}}\right)\right)}{}$$

By introducing relation (23) into the previous relation, one obtains:

$$\alpha(i, j) = \left(\frac{T_{int} \cdot V_{ac}}{C_{int} \cdot \overline{R_{ac\_ref}} \cdot @ T_{shut} \cdot \left(\left(\Delta NC(i, j) - \overline{\Delta NC^{ND}}\right) + 1\right)}\right). \quad (25)$$

-continued $$\exp\left(\frac{q \cdot Ea_{ref}}{k}\left(\frac{1}{T_{shut}} - \frac{1}{T_{ref}}\right)\right)$$

Factor $\beta(i,j)$ is obtained by combining relations (10), (23), and (24) according to expression:

$$\beta(i, j) = \frac{1}{1 - \frac{K}{Ea_{ref}} \cdot \ln\left(1 + \frac{C_{int}\overline{R_{ac\_ref}} \cdot @T_{shut}}{T_{int} \cdot V_{ac}} \cdot (\Delta NC(i,j) - \overline{\Delta NC^{ND}})\right)} \cdot \frac{T_{shut}^2}{T_{ref}^2} \quad (26)$$

Since, further, the present inventors have observed that in the general case, the second term of the logarithmic argument of the denominator is much lower than 1, relation (26) may be rewritten at the first order according to relation:

$$\beta(i, j) = \frac{1}{1 - \frac{K}{Ea_{ref}} \cdot \frac{C_{int} \cdot \overline{R_{ac\_ref}} \cdot @T_{shut}}{T_{int} \cdot V_{ac}} \cdot (\Delta NC(i,j) - \overline{\Delta NC^{ND}})} \cdot \frac{T_{shut}^2}{T_{ref}^2} \quad (27)$$

Thus, relations (10) can be rewritten according to relations:

$$G_{shut}(i, j) = G_{ref}(i, j) \cdot \alpha(i, j) \cdot \beta(i, j)/N \quad (28)$$

$$\frac{1}{\alpha(i, j)} = \left(1 + \frac{C_{int} \cdot \overline{R_{ac\_ref}} @T_{shut}}{T_{int} \cdot V_{ac}} \cdot D(i, j)\right) \cdot \exp\left(\frac{-q \cdot Ea_{ref}}{k}\left(\frac{1}{T_{shut}} - \frac{1}{T_{ref}}\right)\right)$$

$$\frac{1}{\beta_{i,j}} = \left(1 - \frac{K}{Ea_{ref}} \cdot \frac{C_{int} \cdot \overline{R_{ac\_ref}} @T_{shut}}{T_{int} \cdot V_{ac}}\right) \cdot \frac{T_{ref}^2}{T_{shut}^2} \cdot D(i, j)$$

$$D(i, j) = \Delta NC(i, j) - \overline{\Delta NC^{ND}}$$

where $N = \overline{G_{ref}(i,j) \cdot \alpha(i,j) \cdot \beta(i,j)}$ is the average of all terms of the numerator of the expression of gain table $G_{shut}$.

A good approximation of the normalized gain table simplifying the implemented calculations is obtained according to the following expression:

$$G_{shut}(i, j) = G_{ref}(i, j) \cdot \frac{\alpha(i, j)}{\overline{\alpha}} \cdot \frac{\beta(i, j)}{\overline{\beta}} \quad (29)$$

The average responsiveness correction factor, useful to advantageously maintain the thermographic calibration based on a single factory acquisition, is in this case very well approximated by $N = \overline{\alpha} \cdot \overline{\beta}$. Further, if no process of discrimination of the elements deemed to have drifted or not is applied, term $\overline{\Delta NC^{ND}}$ which appears in operation terms $D(i,j)$ is generally correctly approximated by average $\overline{\Delta NC}$.

Relations (28) and (29) thus still use the initial gain table, which is corrected in terms of dispersion by the resistance variations at the "first order" (terms $\alpha$) and at the "second order" according to the present invention by the TCR variation (terms $\beta$). Finally, just as for the first to embodiment, the average responsiveness variation is accessible via normalization factor N available at the end of the sequence of calculation of the corrected gain table. It should finally be understood that in the previous expressions, parameter K may be expressed according to $T_{shut}$ if need be, and temperatures $T_{ref}$ and $T_{shut}$ may be tabulated if this is considered useful for the correction accuracy.

The thermographic calibration may however be obtained as usually with an initial series of factory acquisitions of the average responsiveness at various temperature. In this case, it is not needed to form or to keep in memory normalization factor N or its components.

It should be noted on reading of relation (28) or (29), that according to this second embodiment, the estimate of the average value of resistances $\overline{R_{ac\_ref}}$ at a known temperature $T_{ref}$ should be available. Further, long-term general drifts intrinsic to the retina materials are not corrected according to this second mode. However, such natural long-term drifts are usually negligible as compared with spatially-limited drifts due to intense overlightings, and have no incidence on the image quality, nor at the first order on signals NC due to the compensated architecture described in FIG. 3, since the active and compensation bolometers essentially drift by the same relative amount and uniformly. Thus, the implementation of the present invention according to this second embodiment remains quite advantageous.

An embodiment of the second embodiment will now be described in further detail in relation with FIG. 5.

The second embodiment starts with a factory calibration step 400 comprising previously-described steps 2001 to 2007. It should be noted, concerning resistance values $R_{ac\_ref}(i,j)$ of imaging bolometers 1011, that the means necessary to obtain at step 2003 an estimate of their average value $\overline{R_{ac\_ref}}$ stored in space 806 at temperature $T_{ref}$ stored in space 805 at step 2002, and to make sure that their dispersion is sufficiently limited to authorize the satisfactory application of the previously-established corrections, are available in factory. Such conditions are satisfied during phases of state-of-the-art calibration based on black bodies. However, it should be noted that during the detector operation, no measurement or estimate of the value of the resistances of imaging bolometers 1011 is available.

The calibration phase further comprises a step 4008 of storage of the parameters of read circuit 20, for example, in an additional memory space of memory 80, that is, value $T_{int}$ of the to integration time period, value $C_{int}$ of integration capacitance 2022, and value $V_{ac}$ of the bias voltage of imaging bolometers 1011.

The method then carries on with a second phase 500 implemented while the detector is in service. This second phase comprises previously-described step 3001 and process 3002, as well as a process of update 5003 of tables of gain 803 and offset 801 and of average responsiveness 809.

Update process 5003 comprises steps of testing 30031, of shutter closing 30032, and of acquisition of raw signal table 30033, described previously.

Update process 5003 carries on with a step 50034 of determination of table $\Delta NC(i,j) = NC_{shut}(i,j) - NC_{ref}(i,j)$ and of its algebraic average $\overline{\Delta NC}$.

Still at 50034, table $D(i,j) = \Delta NC(i,j) - \overline{\Delta NC}$ is calculated, and average resistance value $\overline{R_{ac\_ref}}@T_{shut}$ is estimated as previously at step 30034 by using relation (11), all these data being stored in corresponding tables in memory 1002 of unit 100.

As a more accurate variation, this process is enriched by a sub-process of spatial determination of the resistances which have not drifted. This sub-process for example uses a comparison of the terms of the last gain table(s) previously established in the previous gain table update iterations, as mentioned previously. Average $\overline{\Delta NC^{ND}}$ of values $\Delta NC(i,j)$ of these specific resistances is then calculated instead of $\overline{\Delta NC}$.

Then, at 50035, first-order correction factors $\alpha(i,j)$ and second-order correction factors $\beta(i,j)$ are calculated and stored by unit 100. Optionally, unit 100 also forms averages $\overline{\alpha}$ and $\overline{\beta}$ if a "two point" correction using a normalized table approximated according to relation (29) is implemented.

At 50036, a new gain table is then calculated by unit 100. According to a first variation, the "two-point" correction is implemented by using an "exactly normalized" gain table calculated according to relation (28) and unit 100 calculates a new gain table according to this relation. According to a second variation, the "two-point" correction is implemented by using a gain to table approximately normalized according to relation (29), and unit 100 calculates a new gain table according to this relation.

Still at 50036, optionally, unit 100 calculates a new average responsiveness $\overline{Resp_{shut}}$ according to relation $\overline{Resp_{shut}} = \overline{Resp_{ref}} \cdot N$.

The method then carries on with step 30037 of update of the data of memory 80 described previously.

To simplify expressions, only one temperature measured at one point of the substrate is used. If a plurality of temperature probes are used at various points of the substrate, a tabulated form of parameters $T_{ref}$ and $T_{shut}$ will typically be used everywhere these parameters appear. Similarly, the definition of the gain table update conditions depending on the focal plane temperature is based on the use of a single, of several, or of a combination of these focal plane temperature signals together or with other parameters.

In the first and second previously-described embodiments, the calculation of a new gain table has been disclosed as a succession of elementary calculation steps for clarity. Of course, the new gain table may be calculated in a single step or elementary steps may be grouped in a single step.

Similarly, these embodiments have the advantage of being able to use a single gain table for the "two-point" correction and this, for the entire temperature operating range of the detector. Should the application require it, several gain tables may be used and updated similarly to that described hereabove.

Embodiments where the offset table is also updated have been described. Since the gain table update requires the acquisition of a table of raw signals corresponding to the shutter, this table is advantageously acquired to also implement the offset table. It should however be understood that this update of the offset table, though preferred, is optional. Similarly, the update of the offset table by simple replacement thereof is only a possibility among others. Other types of updates of the offset table may be implemented.

Embodiments using a shutter forming a substantially radiation-uniform scene when it is closed have been described. The use of a shutter enables not only to obtain such a scene independently to from the detector environment, but also enables to obtain a scene having a temperature close, from the point of view of bolometers, to the temperature thereof and of the substrate. As a variation of each of the previously-described embodiments, no shutter is used and the read signals used to perform the gain table correction are those corresponding to a scene observed by the detector. The scene should however be substantially uniform, or made uniform at the focal plane level, for example, by means of a defocusing of the image and preferably at a temperature on the order of that of the focal plane, typically distant from said temperature by less than 20° C.

Figure 6:
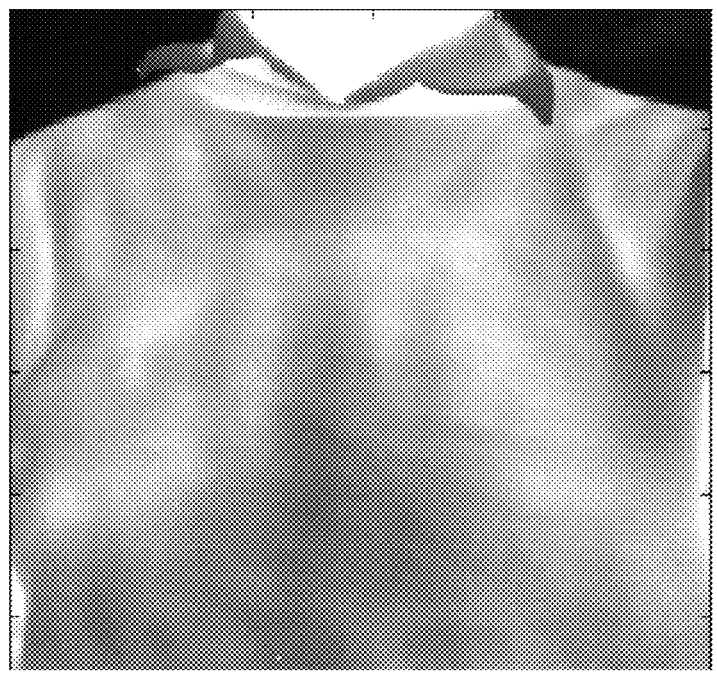
FIG. 6 is an image of the same scene as in FIG. 1, obtained in the same operating conditions but corrected according to the method of the present invention.

FIG. 6 is a thermal image obtained from a bolometric detector according to the second embodiment in the same operating conditions as those described in relation with FIG. 1. As can be observed, the dark spots due to an insufficient state-of-the-art correction are now perfectly corrected.

The foregoing results in the many advantages of the present invention, among which:

an effective correction of bolometer drifts due to an intrinsic change in their characteristic, especially after strong illuminations, and this without using calibration procedures requiring returning to the manufacturer;

the possibility of using one and the same gain table for the entire temperature operating range of the detector;

an effective correction of bolometer drifts, be they general (simultaneously affecting all pixels) or local (so-called remanent images), whether the detector is temperature-regulated or not;

the ability to use normalization factor N of the corrected gain table for the correction of the thermometric responsiveness calibration, even with a simplification of the factory calibration to a single reference focal plane temperature;

the possibility of implementing the local drift correction, including on detectors which do not estimate resistance values. The method thus applies to this type of detector already in service, by means of the update of the correction process according to the method of the present invention;

further, according to the present invention, the contributions to average responsiveness variations respectively due to the general or local drift of the intrinsic bolometer characteristics and to the variations (drift) of the focal plane temperature (for cameras with a focal plane with a non-regulated temperature) are known independently. It is thus possible to advantageously exploit these contributions independently, for example, to provide information particularly useful to the camera user, to start storage processes (logging) of the system lifetime, to start automatic operating protocols outside of the field of the present invention, to authorize specific data processings also outside of the field of the present invention. Statistics relative to the dating, recurrence, intensity, density, and space location of intense irradiation episodes can thus be formed.

It should also be noted that relations (8) and (9) enabling to deduce an activation energy variation of a resistive bolometer according to a variation of its electric resistance may be the object of many other applications.

They may for example be used in digital simulators to model the variation of the bolometer activation energy based on experimental data.

Such relations may also be the object of diagnosis devices to determine the behavior of bolometers for a given temperature. Indeed, knowing the initial electric resistance and activation energy of a bolometer for a given temperature, and by measuring the current resistance of the bolometer for this same temperature, it is possible to simply detect whether bolometers have strongly drifted, for example due to an intense irradiation, by calculating the current activation energy by means of relations (8) and (9) and by comparing the calculated value with the initial value of the activation energy.

It is thus possible to detect the bolometers having drifted in a retina, for example, in order to perform a specific windowing in the frames originating from this retina. This detection of the bolometers having drifted may thus advantageously be implemented in the remanence phenomenon correction device described in document WO 2010/037944 to determine the area of the retina, or window, where the correction applies.

The invention claimed is:

1. A method for detecting infrared radiation comprising:
providing a resistive bolometer retina device comprising a plurality of resistive bolometers suspended above a substrate of a bolometric detector;
acquiring said infrared radiation by said resistive bolometer retina, thereby producing a plurality of raw read signals provided by said bolometers;
correcting a response dispersion of the resistive bolometers in the raw read signals using a correction gain table, each gain of the correction gain table being associated with a bolometer of a corrected resistive bolometer retina device, wherein the method comprises the correction of the gain table, said correction comprises:
acquiring read signals from the resistive bolometer retina corresponding to a temperature-uniform scene;
calculating a table g(i,j) for correcting the gain table according to the acquired read signals according to relation:

$$g(i, j) = \frac{R_{ac\_shut}(i, j)}{R_{ac\_shut}(i, j)} \cdot \frac{TCR_{ref}(i, j)}{TCR_{shut}(i, j)}$$

and correcting the gain table according to relation:

$$G_{shut}(i, j) = \frac{g(i, j) \cdot G_{ref}(i, j)}{N}$$

where:
(i,j) represent the coordinates of the bolometers in the resistive bolometer retina and the tables;
$G_{ref}$ and $G_{shut}$ respectively are the gain table before correction and the corrected gain table;
$R_{ac\_shut}(i,j)$ is a value of the resistance of the bolometer of coordinates (i,j) at a time of acquisition of the read signals;
$R_{ac\_ref}(i,j)$ is a value of the resistance of the bolometer of coordinates (i,j) at a previous time;
$TCR_{shut}(i,j)$ is a value of the temperature variation coefficient of the bolometer of coordinates (i,j) at the time of acquisition of the read signals;
$TCR_{ref}(i,j)$ is a value of the temperature variation coefficient of the bolometer of coordinates at (i,j) at the previous time; and
N is a scalar factor for normalizing gain table $G_{shut}$.

2. The method of claim 1, wherein:
the bolometric material of the resistive bolometers is amorphous silicon or a silicon-germanium alloy,
values $R_{ac\_ref}(i,j)$ are resistance values of the bolometers for an average temperature $T_{ref}$ thereof, and
term $$\beta(i, j) = \frac{TCR_{ref}(i, j)}{TCR_{shut}(i, j)}$$

is calculated according to relation:

$$\beta(i, j) = \frac{1}{1 + \frac{K}{E_{a\_ref}} \cdot \ln\left(\frac{R_{ac\_shut}(i, j)}{R_{ac\_ref}(i, j)@T_{shut}}\right)} \cdot \frac{T_{shut}^2}{T_{ref}^2}$$

where:
$T_{shut}$ is an average temperature of the bolometers at the time of acquisition of the signals;
K is a predetermined coefficient depending on the resistive bolometers;
$E_{a\_ref}$ is a predetermined value of the bolometer activation energy;
ln is the natural logarithm;
$R_{ac\_ref}(i,j)@T_{shut}$ is a value at the previous time of the resistance of the bolometer of coordinates (i,j) for temperature $T_{shut}$; and
$T_{ref}$ is an average temperature of the bolometers at the previous time.

3. The method of claim 2, wherein:
the read signal of each bolometer of the resistive bolometer retina is an output voltage of an integrator integrating in a capacitor for a predetermined time period a difference between a current flowing through the bolometer submitted to a constant bias voltage and a common-mode current;
and in that term β(i,j) is calculated according to relation:

$$\beta(i, j) = \frac{1}{1 - \frac{K}{E_{a\_ref}(i, j)} \cdot \frac{C_{int} \overline{R_{ac\_ref}} @T_{shut}}{T_{int} \cdot V_{ac}} \cdot} \cdot \frac{T_{shut}^2}{T_{ref}^2}$$
$$((NC_{shut}(i, j) - NC_{ref}(i, j)) - (\overline{NC_{shut}} - \overline{NC_{ref}}))$$

where:
$C_{int}$ is a capacitance value of the integrator capacitor;
$T_{int}$ is a value of the integration time;
$V_{ac}$ is a value of the bias voltage applied to the bolometer during the integration;
$NC_{shut}(i,j)$ is a value of the signal provided by the bolometer of coordinates (i,j) at the time of acquisition of the read signals;
$NC_{ref}(i,j)$ is a predetermined value of the read signal provided by the bolometer at the previous time;
$\overline{NC_{shut}}$ is an average value of the read signals all over the resistive bolometer retina or on a predetermined portion thereof;
$\overline{NC_{ref}}$ is a predetermined average value of the read signals at the previous time; and
$\overline{R_{ac\_ref}}@T_{shut}$ is an average value of resistance values $R_{ac\_ref}(i,j)@T_{shut}$ of the bolometers at the previous time for temperature $T_{shut}$.

4. The method of claim 2, wherein the bolometers are made of amorphous silicon, and wherein the predetermined coefficient K is constant and equal to 0.055 eV.

5. The method of claim 2, wherein several values of the predetermined coefficient K are stored according to respective temperatures of the bolometers, especially a value equal to 0.055 eV at the 30° C. temperature for bolometers made of amorphous silicon and wherein a value of coefficient K for temperature $T_{shut}$ at the time of acquisition of the signals is determined according to said stored values.

6. The method of claim 2 comprising a step of identification of the bolometers of the resistive bolometer retina having undergone a drift of their characteristic, and wherein average value $\overline{NC_{shut}}$ of the read signals is obtained for read signals of bolometers of the resistive bolometer retina which have not undergone said drift.

7. The method of claim 2, wherein value $R_{ac\_ref}(i,j)@T_{shut}$ of the resistance of coordinates (i,j) at the previous time for temperature $T_{shut}$ is determined according to relation:

$$R_{ac\_ref}(i, j)@T_{shut} = R_{ac\_ref}(i, j) \cdot \exp\left(\frac{q \cdot Ea_{ref}}{k}\left(\frac{1}{T_{shut}} - \frac{1}{T_{ref}}\right)\right)$$

where:
  q is the elementary charge of an electron; and
  k is Boltzmann's constant.

8. The method of claim 2, wherein the bolometers are made of amorphous silicon, and wherein activation energy $E_{a\_ref}$ is 0.170 eV.

9. The method of claim 1, wherein:
  the read signal of each bolometer of the resistive bolometer retina is an output voltage of an integrator integrating in a capacitor for a predetermined time period a difference between a current flowing through the bolometer submitted to a constant bias voltage and a common-mode current;
and term $$\alpha(i, j) = \frac{R_{ac\_shut}(i, j)}{R_{ac\_ref}(i, j)}$$

is calculated according to relation:

$$\alpha(i, j) = \frac{\exp\left(\frac{q \cdot Ea_{ref}}{k}\left(\frac{1}{T_{shut}} - \frac{1}{T_{ref}}\right)\right)}{1 + \frac{C_{int} \cdot \overline{R_{ac\_ref}}@T_{shut}}{T_{int} \cdot V_{ac}} \cdot ((NC_{shut}(i, j) - NC_{ref}(i, j)) - (\overline{NC_{shut}} - \overline{NC_{ref}}))}$$

where:
  $C_{int}$ is a capacitance value of the integrator capacitor;
  $T_{int}$ a value of the integration time;
  $V_{ac}$ is a value of the bias voltage applied to the bolometer during the integration;

$NC_{shut}(i,j)$ is a value of the signal provided by the bolometer of coordinates (i,j) at the time of acquisition of the read signals;

$NC_{ref}(i,j)$ is a predetermined value of the read signal provided by the bolometer at the previous time;

$\overline{NC_{shut}}$ is an average value of the read signals over the resistive bolometer retina or on a predetermined portion thereof;

$\overline{NC_{ref}}$ is a predetermined average value of the read signals at the previous time;

$\overline{R_{ac\_ref}}@T_{shut}$ is an average value of resistance values $R_{ac\_ref}(i,j)@T_{shut}$ of the bolometers at the previous time for temperature $T_{shut}$;

$E_{a\_ref}$ is a predetermined value of the bolometer activation energy;

q is the elementary charge of an electron;

k is Boltzmann's constant; and $T_{ref}$ is an average temperature of the bolometers at the previous time.

10. The method of claim 1, wherein the bolometric detector is capable of implementing a calculation of value $R_{ac\_shut}(i,j)$ of the electric resistance of each bolometer according to the acquired read signals.

11. The method of claim 1, wherein scalar factor N is equal to the average of terms $g(i,j) \cdot G_{ref}(i,j)$.

12. The method of claim 1, wherein the detector comprises a shutter arranged in front of the resistive bolometer retina and wherein the retina read signals are acquired when the shutter is closed.

13. The method of claim 1, wherein the detector is a detector with a non-regulated temperature and wherein the method comprises a step of measurement of a detector temperature at the time of acquisition of the read signals.

14. The method of claim 1, wherein the method further comprises a step of correction of an average responsiveness of the bolometric detector used in a thermometric calculation according to relation $\overline{Resp_{shut}} = \overline{Resp_{ref}} \cdot N$, where $\overline{Resp_{shut}}$ is the corrected average responsiveness, and $\overline{Resp_{ref}}$ is the average responsiveness of the detector at the previous time.

15. A bolometric detector comprising a retina of resistive bolometers made of amorphous silicon or of a silicon-germanium alloy, said retina being suspended above a substrate, a circuit for forming signals for the reading of said retina, and a unit for correcting the signals delivered by the signal-forming circuit capable of correcting the signals delivered by the signal-forming circuit according to a gain table, wherein the detector comprises means for correcting the gain table capable of implementing the method of claim 1.

* * * * *

UNITED STATES PATENT AND TRADEMARK OFFICE
CERTIFICATE OF CORRECTION

PATENT NO. : 9,442,020 B2  
APPLICATION NO. : 13/771950  
DATED : September 13, 2016  
INVENTOR(S) : Alain Durand et al.

It is certified that error appears in the above-identified patent and that said Letters Patent is hereby corrected as shown below:

In the Claims

Column 31, Claim 1, Line 30 delete "$g(i,j) = \frac{R_{ac\_shut}(i,j)}{R_{ac\_shut}(i,j)} \cdot \frac{TCR_{ref}(i,j)}{TCR_{shut}(i,j)}$"

and replace with --$g(i,j) = \frac{R_{ac\_shut}(i,j)}{R_{ac\_ref}(i,j)} \cdot \frac{TCR_{ref}(i,j)}{TCR_{shut}(i,j)}$--;

Column 33, Claim 7, Line 10 delete

"$R_{ac\_ref}(i,j)@T_{shut} = R_{ac\_ref}(i,j) \cdot \exp\left(\frac{q.E_{a\_ref}}{k}\left(\frac{1}{T_{shut}} - \frac{1}{T_{ref}}\right)\right)$" and replace with --$R_{ac\_ref}(i,j)@T_{shut} = R_{ac\_ref}(i,j) \cdot \exp\left(\frac{qE_{a\_ref}}{k}\left(\frac{1}{T_{shut}} - \frac{1}{T_{ref}}\right)\right)$--.

Signed and Sealed this  
Fourteenth Day of February, 2017

Michelle K. Lee  
*Director of the United States Patent and Trademark Office*